(12) United States Patent
Wilkoff

(10) Patent No.: US 11,506,332 B2
(45) Date of Patent: Nov. 22, 2022

(54) MATED DUAL SUPPORT STAND ASSEMBLY

(71) Applicant: Furious Designs LLC, El Segundo, CA (US)

(72) Inventor: Andrew Scott Wilkoff, El Segundo, CA (US)

(73) Assignee: FURIOUS DESIGNS LLC, El Segundo, CA (US)

( * ) Notice: Subject to any disclaimer, the term of this patent is extended or adjusted under 35 U.S.C. 154(b) by 142 days.

(21) Appl. No.: 17/039,363

(22) Filed: Sep. 30, 2020

(65) Prior Publication Data

US 2021/0095812 A1    Apr. 1, 2021

Related U.S. Application Data

(60) Provisional application No. 62/909,124, filed on Oct. 1, 2019.

(51) Int. Cl.
*F16M 11/38* (2006.01)
*F16B 1/00* (2006.01)
*B62H 3/00* (2006.01)

(52) U.S. Cl.
CPC ............ *F16M 11/38* (2013.01); *B62H 3/00* (2013.01); *F16B 1/00* (2013.01); *F16B 2001/0028* (2013.01); *F16B 2001/0035* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,027,133 A * | 2/2000 | Phillips | ............... | B62H 3/10 248/346.03 |
| 6,412,805 B1 * | 7/2002 | Chen | ............... | B62H 1/04 280/302 |
| 7,059,622 B2 * | 6/2006 | Chuang | ............... | B62H 1/06 280/293 |
| 7,575,207 B2 * | 8/2009 | Chuang | ............... | B62H 1/06 248/168 |
| 7,584,568 B1 * | 9/2009 | Brownlee | ............... | F41C 23/16 89/37.01 |
| 8,465,216 B2 * | 6/2013 | Justice | ............... | F16M 13/022 396/428 |
| 9,862,438 B2 * | 1/2018 | Lin | ............... | B62H 3/00 |
| 10,047,901 B2 * | 8/2018 | Hida | ............... | F16M 11/242 |
| 10,088,096 B2 * | 10/2018 | Minn | ............... | F16M 11/14 |
| 10,260,675 B2 * | 4/2019 | Miller | ............... | A47G 33/12 |
| 10,927,999 B1 * | 2/2021 | Wojcik | ............... | F16M 11/16 |

(Continued)

*Primary Examiner* — Monica E Millner
(74) *Attorney, Agent, or Firm* — Alleman Hall Creasman & Tuttle LLP

(57) ABSTRACT

An assembly for mated dual support stands is presented. The assembly comprises two support stands. Each support stand includes three or more legs operable between a closed conformation and an open conformation, such that in the closed conformation, the two support stands reversibly mate with each other. A support interface is positioned opposite the legs so that the support interface is reversibly attachable to an elongated tube via attachment components. A center adaptor is positioned connected to the support interface on one end and the three or more legs on the opposite end. The center adaptor and support interface are rotatably coupled.

19 Claims, 25 Drawing Sheets

(56) References Cited

U.S. PATENT DOCUMENTS

| | | | |
|---|---|---|---|
| 2011/0228524 A1* | 9/2011 | Greer | F21L 4/00 |
| | | | 362/190 |
| 2019/0107263 A1* | 4/2019 | Adams | F21V 23/06 |
| 2019/0113213 A1* | 4/2019 | Vartan | F21V 21/06 |
| 2021/0033269 A1* | 2/2021 | Joyce | G08B 5/36 |

* cited by examiner

MATED DUAL SUPPORT STAND ASSEMBLY

CROSS REFERENCE TO RELATED APPLICATIONS

This Application claims priority to U.S. Provisional Patent Application Ser. No. 62/909,124, filed Oct. 1, 2019, the entirety of which is hereby incorporated herein by reference for all purposes.

BACKGROUND

The handlebars of a bicycle offer a convenient location to mount gear that enhances and improves the cycling experience. In some situations, the gear is critical to operation of the bicycle. For example, electric bicycles (or E-bikes) augment the traditional cycling experience with an integrated electric motor that assists the user's pedal power, typically employing a handlebar mounted console that monitors and provides control over the motor. E-bikes still encounter many of the same problems as traditional bicycles, such as chain drop, wheel misalignment, flat tires, broken chains, etc. Often, these problems must be addressed in the field to allow the rider to proceed.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

An assembly for mated dual support stands is presented. The assembly comprises two support stands. Each support stand includes three or more legs operable between a closed conformation and an open conformation, such that in the closed conformation, the two support stands reversibly mate with each other. A support interface is positioned opposite the legs so that the support interface is reversibly attachable to an elongated tube via attachment components. A center adaptor is positioned connected to the support interface on one end and the three or more legs on the opposite end. The center adaptor and support interface are rotatably coupled.

BRIEF DESCRIPTION OF THE DRAWINGS

FIGS. 1, 2, and 4-22 are drawn to scale; however, other dimensions may be used without departing from the scope of this disclosure.

DETAILED DESCRIPTION

Cyclists are frequently charged with performing on-the-go repairs to their bicycles, particularly to tires, chains, gears, and other components on the underside of the bicycle. Electric bicycles (i.e., E-bikes) mate the pedal power of a bicycle with an integrated electric motor that assists propulsion. E-bikes thus have additional underside components that may need to be serviced, such as the motor, battery, freewheel, clutch, torque arm, cables, etc.

To access and repair components on the underside of a bicycle, a cyclist may typically flip the bike over to rest on its handlebars and seat, making the underbody accessible to a standing cyclist. Many users of traditional bicycles use handlebar-mounted consoles to chart speed, elevation, calories burned, location, etc. Often, this console doubles as the cyclist's cellular phone, imparting considerable value. Further, many E-bikes include a critical, handlebar-mounted console. Such a console may have a touch-sensitive display that both provides feedback and metrics to the cyclist, and allows the cyclist to adjust performance characteristics of the electric motor on the fly. A throttle may be included in or near the console. The complexity of the componentry of an E-bike often necessitates inverting the E-bike to make repairs, and the E-bike may need to be inverted for a considerable period of time to complete the repair process.

Often, bicycle component failures occur at inopportune locations, forcing the cyclist to perform repairs on the side of a road or trail, where the ground is uneven, wet, rough, or could otherwise damage a handlebar-mounted console if the bicycle or E-bike was inverted. Such consoles may not be easily adjustable or removable, particularly when wired to other distal components.

As such, there is a need for a device that is portable, lightweight, that can be used to prop the bicycle handlebars off the ground in a way so that the bicycle does not rest on its console when inverted, and is adaptable to different surface types and varying degrees of surface evenness.

Herein, examples are described for an assembly including a matched pair of lightweight, portable support stands that reversibly attach to an elongated tube, such as a set of bicycle handlebars. When deployed, the support stands create a stable offset between the ground and the handlebars of an inverted bicycle, providing clearance for a handlebar mounted console, Thus, the bicycle may be rested upside down while doing field repairs without concerns about damaging the console or other components resting on the handlebars. When not in use, the support stands magnetically lock together and can be stowed with a modest footprint in a trunk bag, backpack, bottle holder, etc.

Figure 1:
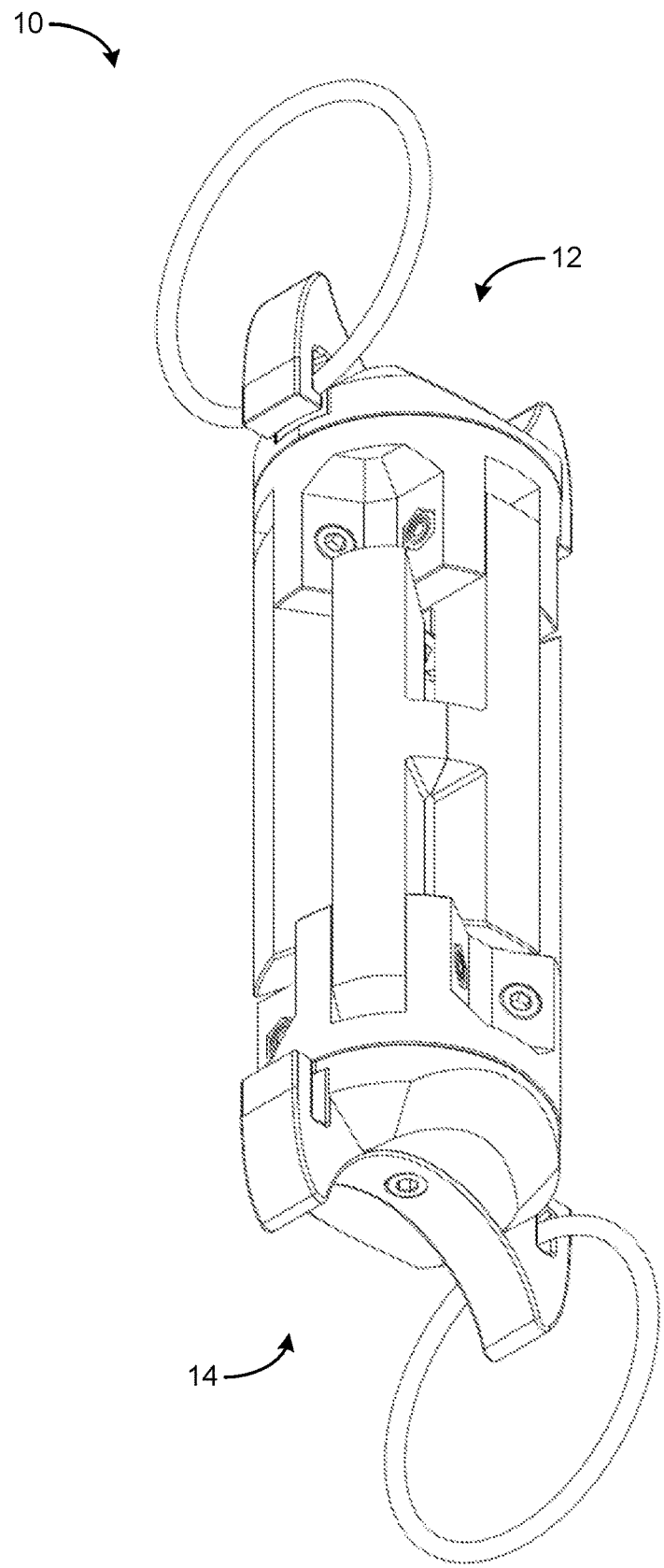
FIG. 1 shows a perspective view of a mated dual support stand assembly of a first embodiment.

A first example embodiment is depicted in FIGS. 1, 2, 4-11, and 21-25. FIG. 1 shows an example mated dual support stand assembly 10, comprising a first support stand 12 and a second support stand 14. Each of first support stand 12 and second support stand 14 are configured to be adjustable between a closed conformation (shown in FIGS. 4-8, 22, and 23) and an open conformation (shown in FIGS. 9-11, 24, and 25). In the closed conformation, first support stand 12 and second support stand 14 are configured to reversibly mate to form mated dual support stand assembly 10.

Figure 3:
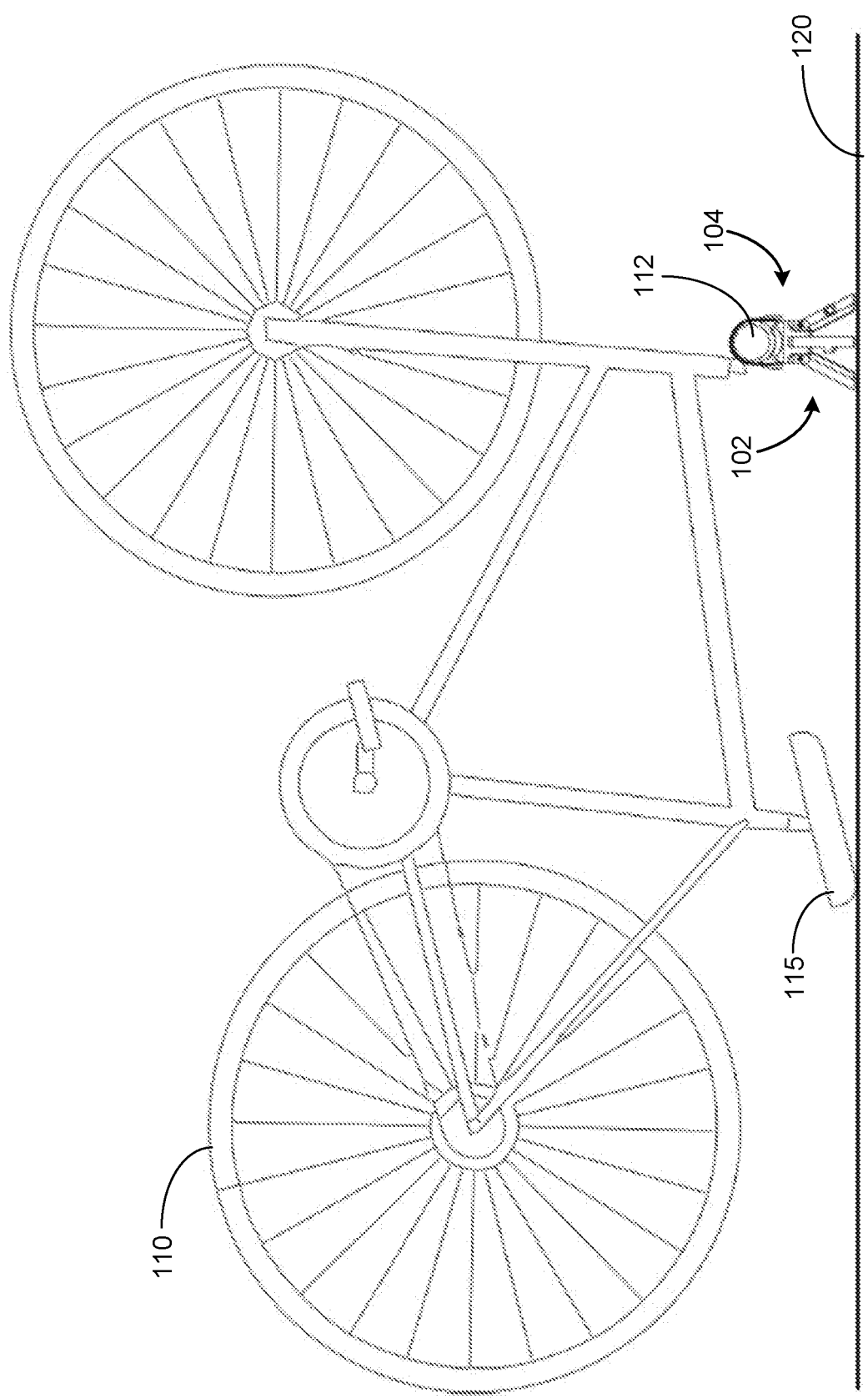
FIG. 3 shows an example use-case scenario for a dual support stand assembly.

FIG. 3 shows an example use case scenario for a first support stand 102 and a second support stand 104 in the open conformation. First support stand 102 and second support stand 104 may be examples of first support stand 12 and second support stand 14, among other examples (see, second embodiment with reference to FIGS. 12-17) A bicycle 110 is shown inverted. First support stand 102 and second support stand 104 are coupled to opposite sides of handlebars 112, so that first support stand 102, second support stand 104, and seat 115 rest on the ground 120. Ground clearance is generated by first support stand 102 and second support stand 104, thereby allowing a handlebar-mounted console (not shown) to be propped off the ground, and to not bear the weight of the inverted bicycle 110, so long as the console does not protrude above handlebars 112 by more than the height of support stands 102 and 104.

As described herein, first support stand 12 and second support stand 14 are identical, excepting that first support stand 12 includes a set of magnets with a first polarity, and second support stand 14 includes a set of magnets with a second polarity, opposite the first polarity. With regard to FIGS. 2, 4-11, and 22-25, wherein only a single support stand is shown, the stand and its components will be described with reference to first support stand 12. Excepting for the magnets and where otherwise noted, it should be assumed that the same components and configurations are also present on second support stand 14. Example dimensions and angles are shown in the examples depicted in FIGS. 21-25. However, other dimensions and angles, both absolute and relative, may be used without departing from the scope of this disclosure. A second example embodiment is described herein and with regard to FIGS. 12-20.

In some examples, the primary components of the support stands may be manufactured from rigid, lightweight plastic, however other suitable materials, such as titanium, aluminum, etc. may also be used. Nuts and bolts may likewise be metal, ceramic, plastic, or other durable, lightweight materials. Some components, such as the legs, may be made to be hollow, semi-hollow, or otherwise partially excavated to reduce the weight of the component without significantly impacting the weight-bearing capability of the support stands.

Figure 2:
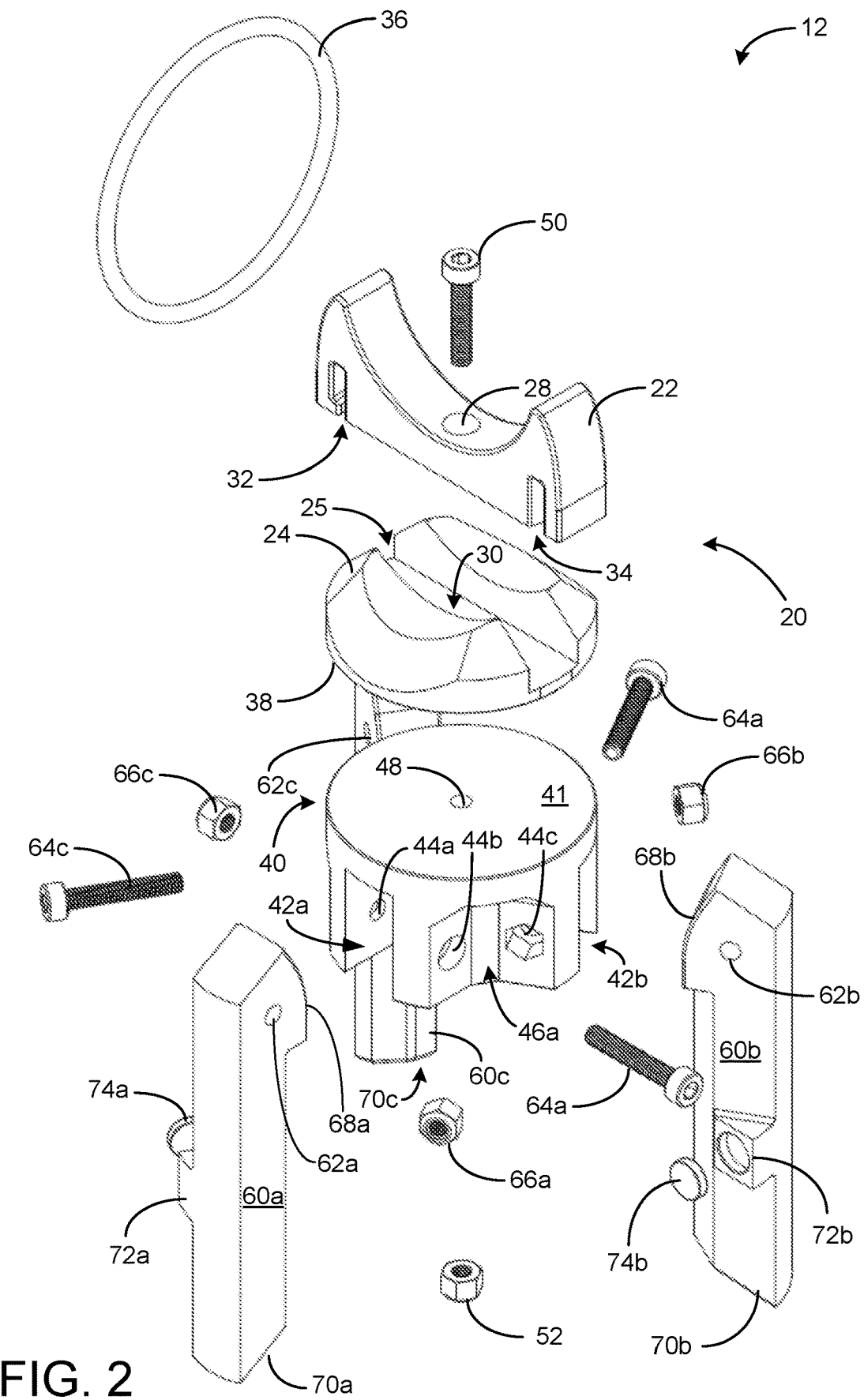
FIG. 2 shows an exploded view of a single support stand of the first embodiment.

Parts of each support stand will be described with reference to the exploded view of first support stand 12 shown in FIG. 2 as well as FIGS. 4-11 where appropriate. First support stand 12 includes a support interface 20, which may directly interface with an elongated tube, such as a handlebar and/or handlebar grip to provide support for an inverted bicycle. In this example, support interface 20 comprises two pieces, center insert 22 and support adapter 24. Center insert 22 is shown with a U-shaped inner portion which may serve to mate with and provide a cradle for a cylindrical shaped elongated tube, such as a handlebar. Center insert 22 may nestle within support adapter 24 via insert receiving groove 25. By separating support interface 20 into two portions, different variants of center insert 22 may be used. This may allow, for example, for a user to customize first support stand 12 with a center insert 22 having a curvature that matches their handlebars, thus creating a more secure fit. Center insert 22 may further be customizable with different linings, padding, etc. so as to reduce wear, friction, scuffing, etc. at the interface between support interface 20 and the handlebar.

Figure 4:
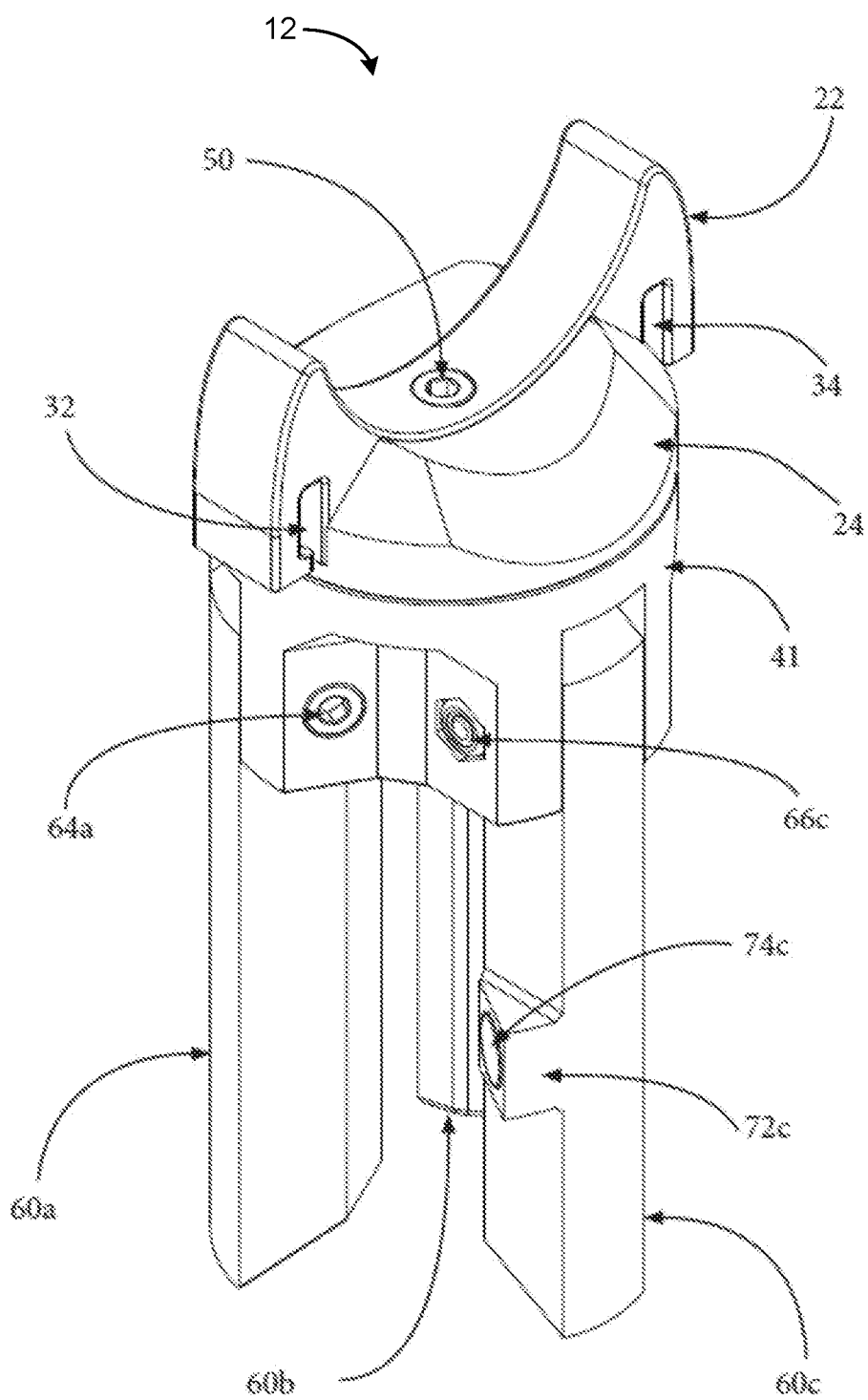
FIGS. 4-8 show perspective views of a single support stand of the first embodiment in a closed conformation.
Figure 5:
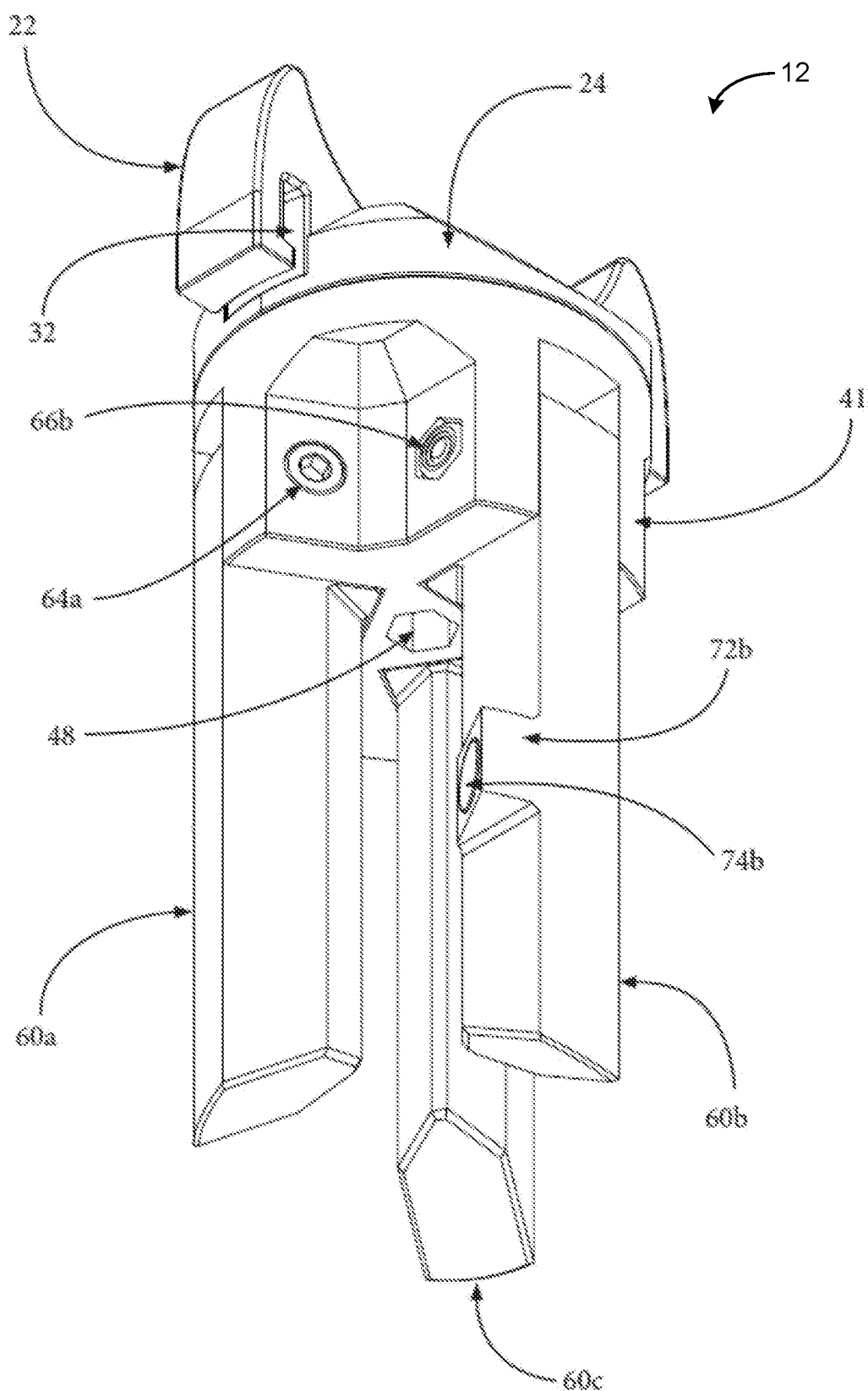
Figure 6:
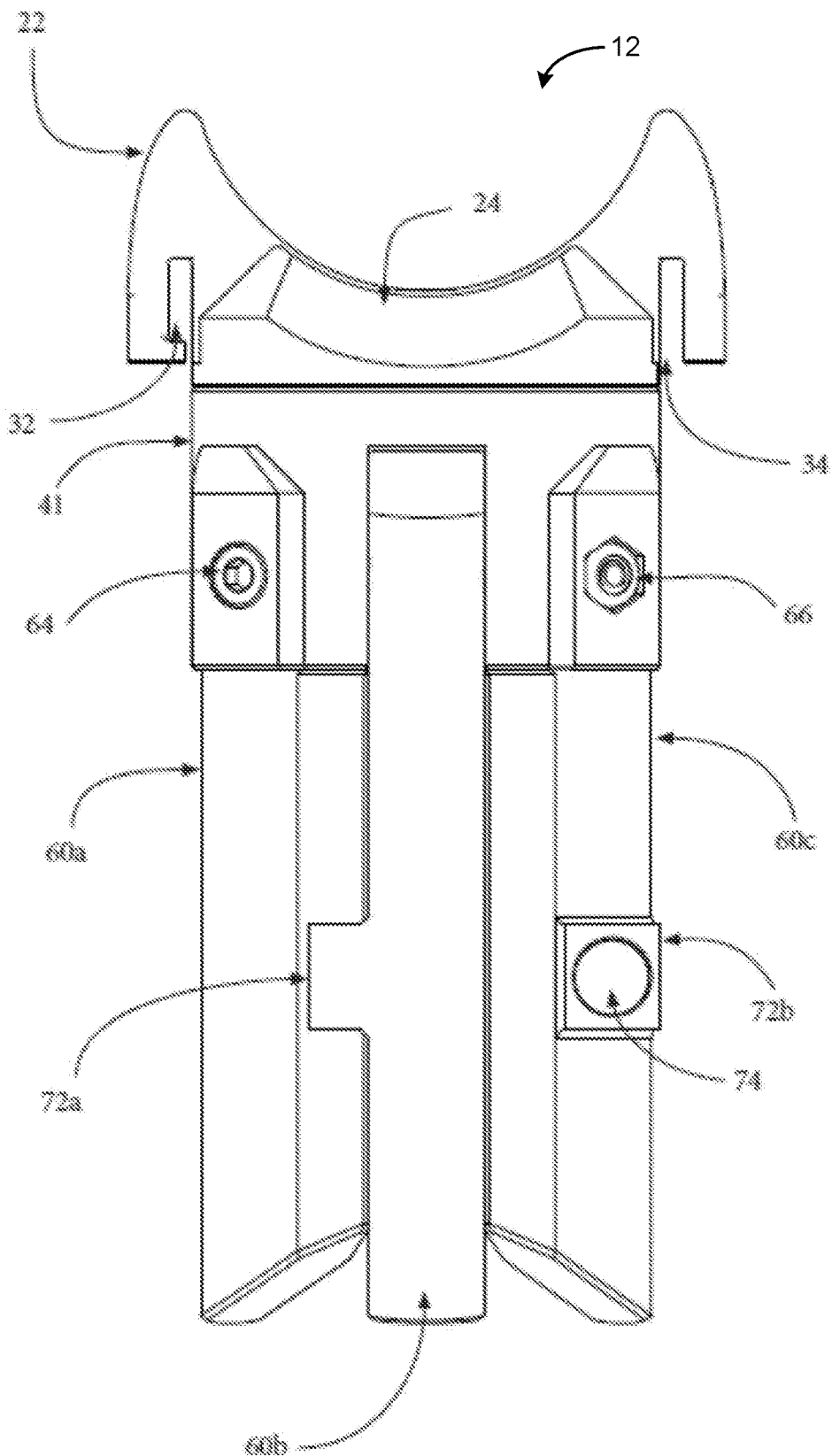
Figure 7:
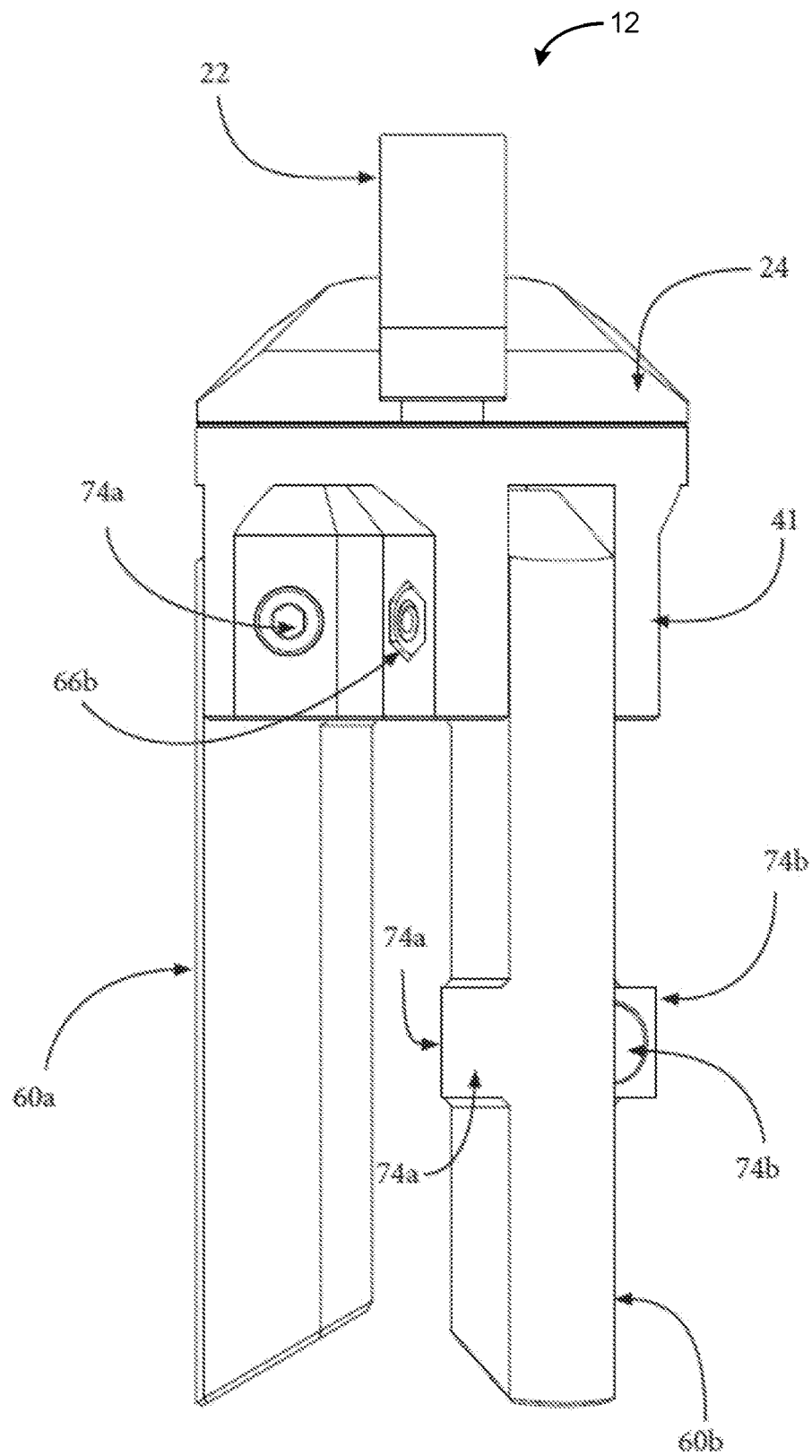
Figure 8:
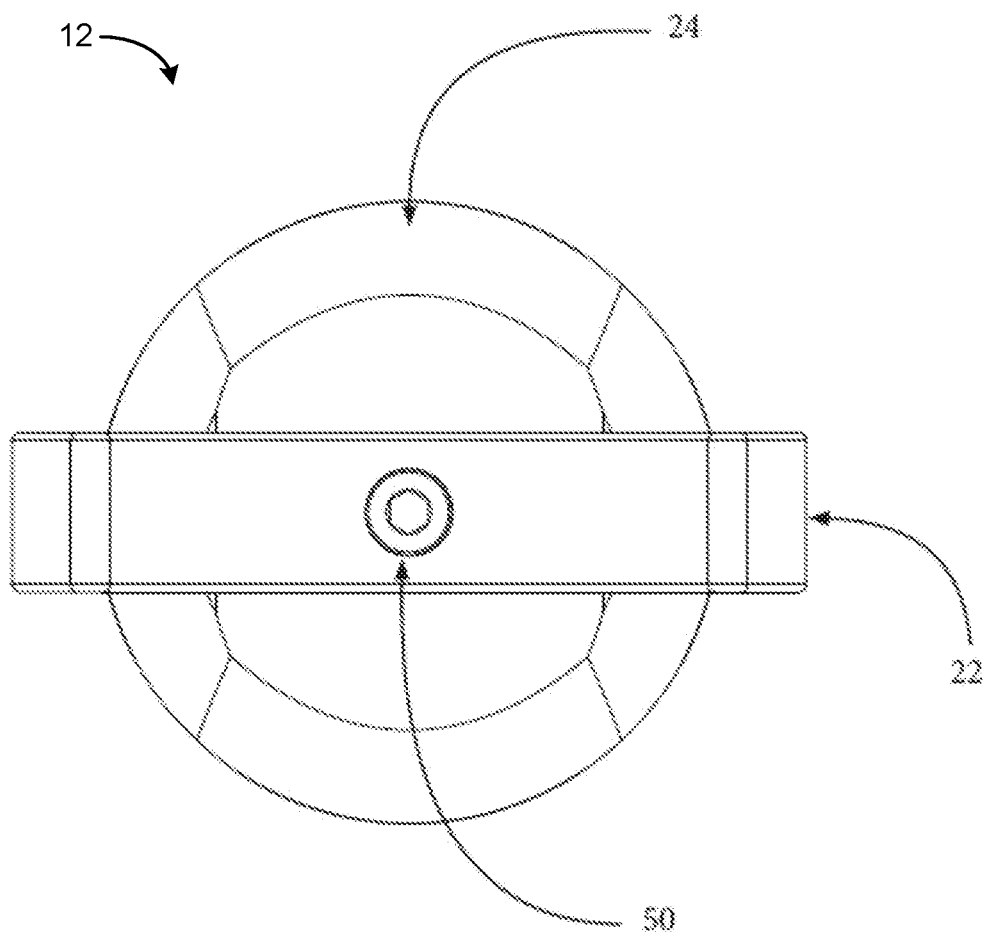
Figure 9:
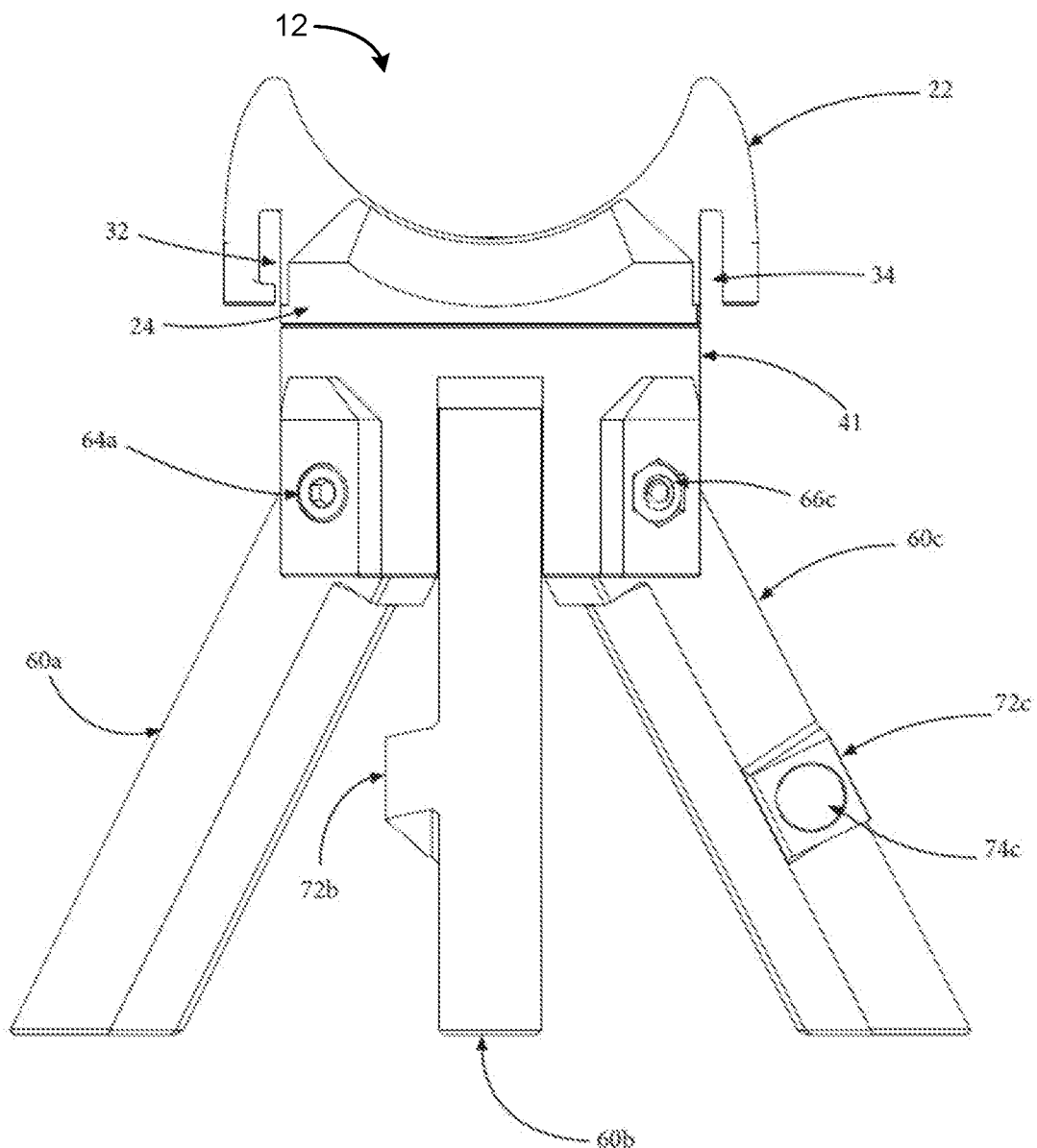
FIGS. 9-11 show perspective views of a single support stand of the first embodiment in an open conformation.
Figure 10:
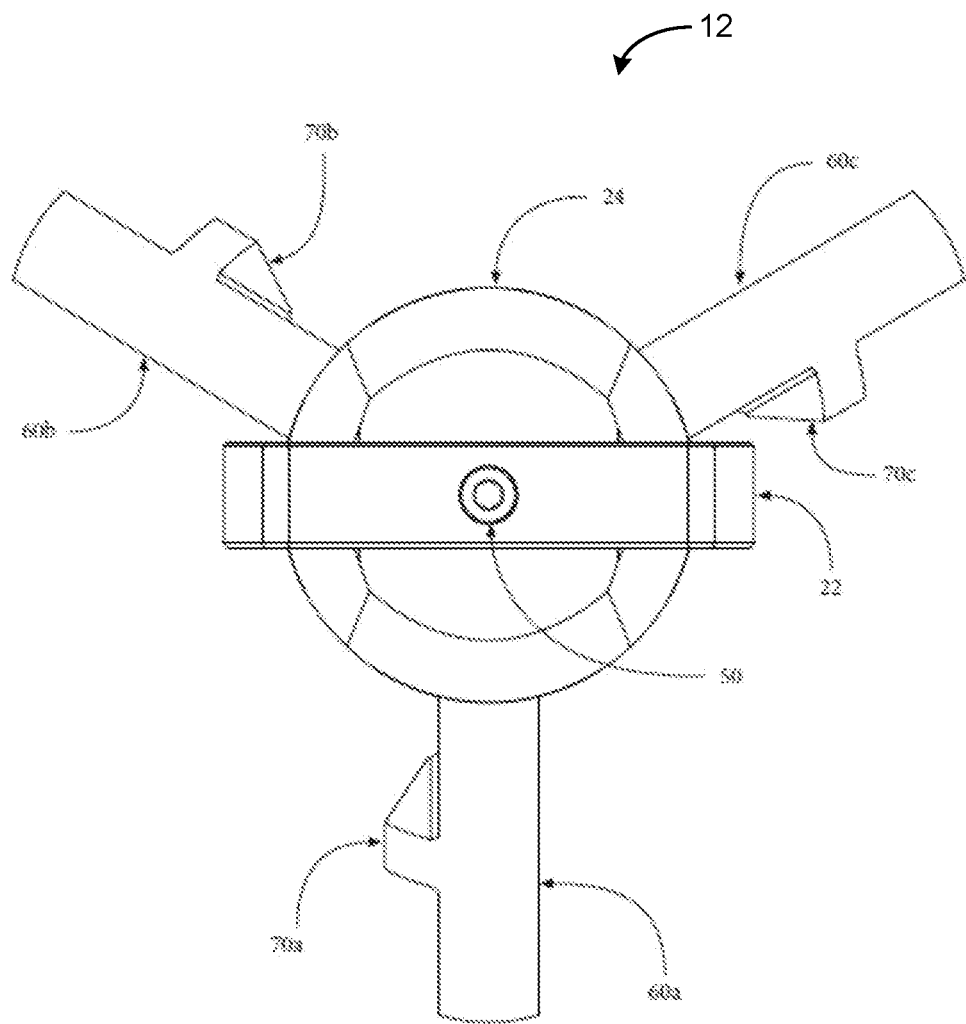
Figure 11:
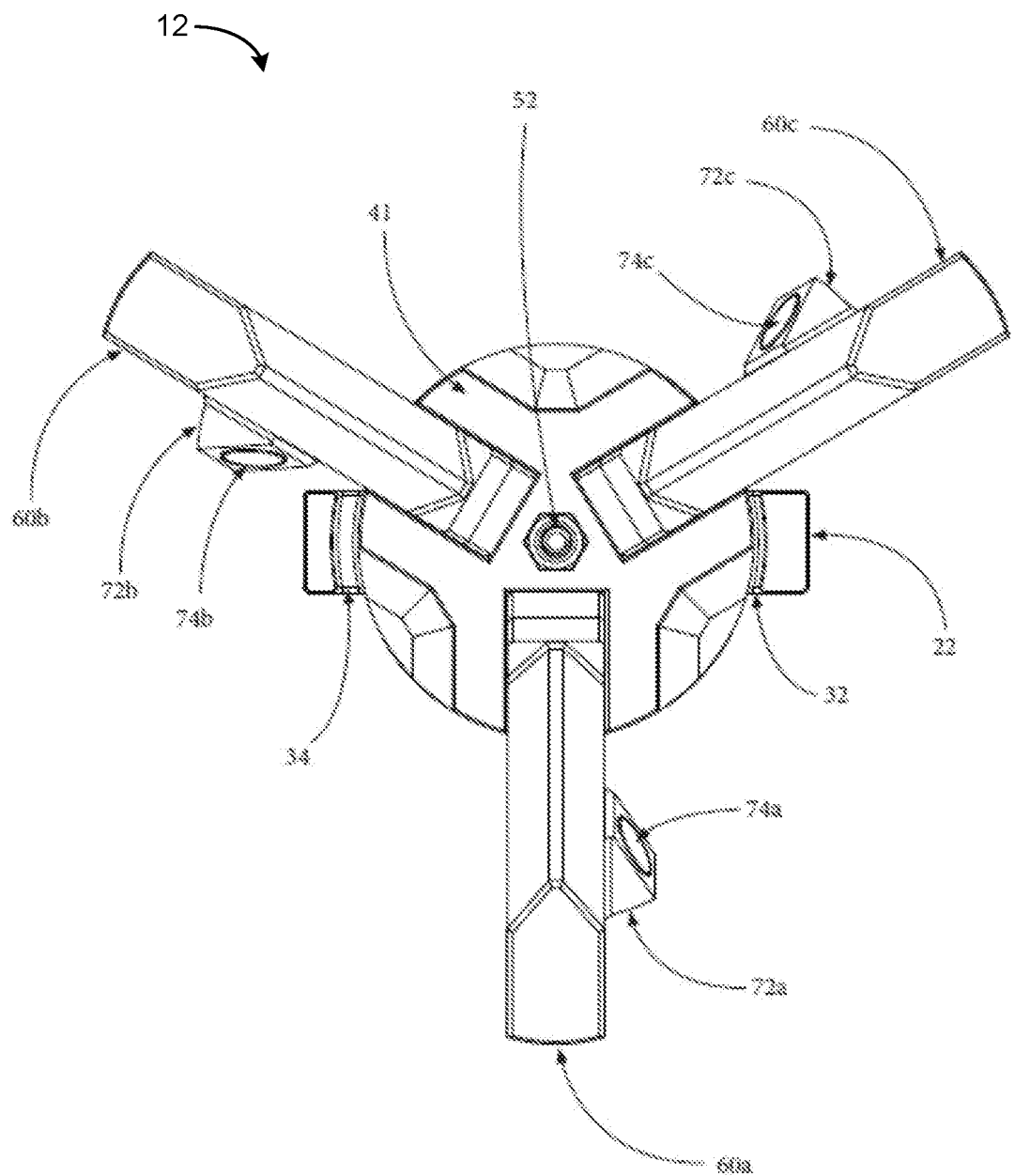

The portions of support adapter 24 that flank insert receiving groove 25 also have a concave shape which extends the U-shaped inner portion of center insert 22 to form support channel 26 within support interface 20 (see, FIGS. 4, 6, and 9). This combined groove provides a larger, curved surface area with which to support an elongated tube. In some examples, part or all of support channel 26 may include bumps, grooves, or other friction generating topology to reduce the risk of the elongated tubes slipping off the support stands.

Center insert 22 may include a center insert mounting hole 28 that may align with a support adapter mounting hole 30 located in the center of support adapter 24. As described further herein, mounting holes 28 and 30 may be used to align support interface 20 and to attach support interface 20 to the rest of first support stand 12 (see FIGS. 4-7).

Support interface 20 may also include components for securely attaching first support stand 12 to an elongated tube. In this example, center insert 22 includes a first attachment point 32 and a second attachment point 34. First attachment point 32 and second attachment point 34 are shown as grooves on opposite ends of center insert 22 (see FIGS. 6 and 9), but other configurations are possible (see for example, FIGS. 15 and 16).

Opposite ends of a securing strap 36 may be inserted into first attachment point 32 and second attachment point 34. In this example, securing strap 36 is configured as an elastomeric strap, wrapping around the elongated tube and completing a circular band formed by two lengths of the elastomeric strap and support channel 26. First attachment point 32 is depicted as a restrictive attachment point and second attachment point 34 is depicted as a permissive attachment point. In other words, first attachment point 32 is configured to restrict, but not necessarily prevent, removal of securing strap 36 and second attachment point 34 is configured to be permissive to removal of securing strap 36, relative to first attachment point 32. In this example, first attachment point 32 has a narrow groove entry, allowing for securing strap 36 to be securely, but reversibly attached to center insert 22 (e.g., during storage). To affix first support stand 12 onto an elongated tube, securing strap 36 may then be wrapped around the elongated tube, and then attached at second attachment point 34. First support stand 12 may then be removed from the elongated tube by simply detaching securing strap 36 from second attachment point 34.

By not permanently affixing securing strap 36 to first attachment point 32, elastomeric straps of varying sizes may be attached, allowing for custom fitting of first support stand 12 to a bicycle's handlebars. Additionally or alternatively, other means of securing first support stand 12 and second support stand 14 to an elongated tube may be used, such as a ratcheted strap, magnetic strap, moldable strap, flexible clamp, etc. One embodiment of a hook-and-loop strap and accompanying attachment points is described herein and with regard to FIGS. 12-18. Some embodiments of securing strap 36 may be configured to be removable from support interface 20, and also used to secure mated support stand assembly 10 together.

Support adapter 24 further features support adapter base 38, positioned opposite insert receiving groove 25. Support adapter base 38 is configured to interface with center adaptor 40 at center adaptor top 41. Center adaptor 40 functions to couple support interface 20 to the legs of first support stand 12. As such, center adaptor 40 includes three leg mounts (42a, 42b, and 42c). In this configuration, first support stand 12 is a tripod (see, FIGS. 9-11), but in other configurations, the stand may have more legs, and thus correspondingly more leg mounts. Each leg mount includes a pair of mounting holes (44a, 44b, 44c, 44d, 44e, 44f), each mounting hole situated on a separate partition, such that two partitions form a leg mount, and such that each pair of adjacent leg mounts is separated by an indentation (46a, 46b, and 46c) (see FIGS. 4-7, 9, 11). As described further herein and with regard to FIGS. 18-22, the indentations may be shaped to receive a base of a leg from a mated support stand.

A central cavity 48 aligns with center insert mounting hole 28 and support adapter mounting hole 30. A center bolt 50 may be inserted through center insert mounting hole 28, support adapter mounting hole 30, and central cavity 48, and secured with center nut 52 (see FIGS. 10-11). When assembled in this way, support interface 20 and center adaptor 40 may be rotatably coupled. Support adapter base 38 and center adaptor top 41 may each have relatively smooth surfaces allowing for rotation, while center bolt 50 and center nut 52 may provide friction through tight coupling so that the pieces can adopt a stable conformation, and thus do not necessarily freely rotate. This enables the support interface to rotate along its axis responsive to user-driven rotation, thereby ensuring the legs are properly aligned during setup.

As described, first support stand 12 is a tripod including three legs (60a, 60b, and 60c). Each leg may be attached to center adaptor 40 such that the leg may be operable between at least a closed conformation (see FIGS. 4-7) and an open conformation (see FIGS. 9-11). Each leg includes an adaptor mounting hole (e.g., 62a, 62b, and 62c) extending through a top portion of the leg. Leg mounting bolts (64a, 64b, and 64c) and leg mounting nuts (66a, 66b, and 66c) may be used to attach each leg to its corresponding leg mount. For example, leg mounting bolt 64a may be inserted through mounting hole 44b, pass through leg mounting hole 62a, and into mounting hole 44a, where it may mate to leg mounting nut 66a, thereby attaching leg 60a to leg mount 42a. Mounting hole pairs, such as mounting holes 44a and 44b, may be configured with differently shaped apertures. For example, mounting hole 44a may be shaped to fit a hexagonal nut, while mounting hole 44b may be shaped to fit a circular bolt head.

Each leg may further include a motion restrictor (e.g., 68a, 68b, and 68c) that interfaces with the respective leg mount. For example, leg 60a may pivot around mounting bolt 64a. Motion restrictor 68a may be sized and shaped to restrict movement of leg 60a into a closed conformation and an open conformation by abutting the leg mount in those positions. This may make it easier for a user to operate the support stand between the open and closed conformations, while also ensuring that all three legs are adopting equivalent conformations. Additional movement restriction components are described herein and with regard to FIGS. 12-17.

Each leg further has a leg base (e.g., 70a, 70b, and 70c) configured to interface with the ground when first support stand 12 is in the open conformation. As shown, the leg bases are flat, but other shapes may be used (e.g., rounded, spiked). Further, the leg bases may include materials and/or shapes that increase friction, thereby stabilizing the support stand and bicycle on various surfaces. In some examples, a removable attachment may be inserted, screwed on, or otherwise coupled to the leg base to allow for a choice of configuration that best matches the surface the support stands are to rest on (e.g., plush surface for working on polished floors, spiked cleat for working in soft grass).

As shown, legs 60a, 60b, and 60c are a fixed size. However, as the legs may easily be removed via removal of the mounting bolts, different sized legs may be attached. In this way, the height and/or contact radius of the support stand may be adjusted, allowing the user to set the distance between the ground and the handlebars to accommodate their specific ground clearance needs (e.g., size of the console). In some examples, the legs may be telescoping, foldable, or otherwise expandable to different lengths (e.g. screw-on extensions). Additionally, or alternatively, the motion restrictors may be configured to stop leg rotation at multiple positions, thereby allowing for multiple heights and ground radii. In still further examples, the legs may be a fixed length, but the distance between the top of the legs and support interface 20 may be adjustable. For example, support interface 20 and center adaptor 40 may be coupled together via a telescoping or rotating insert that allows the height of this portion of the support stand to be altered. Example dimensions, angles, and arc lengths are described herein and with regard to FIGS. 18-22.

Each leg further includes a mating coupler (e.g., 72a, 72b, 72c) that houses a small magnet. Mating couplers 72a-72c extend laterally from their respective leg. As shown in FIG. 1, this extension allows the magnets from first support stand 12 to mate with their counterparts from second support stand 14, while allowing the width, and thus the weight of the legs to be reduced. In this example, support stand 12 includes three first polarity magnets (e.g., 74a, 74b, 74c), while support stand 14 includes three second polarity magnets (e.g., 76a, 76b, 76c). For example, first polarity magnets 74a-74c may have a positive-out configuration, while second polarity magnets 76a-76c have a negative-out configuration (or vice-versa).

Support stands 12 and 14 may thus be mated and magnetically connected to each other to form mated support stand assembly 10 when not in use. This allows the support stands to have a smaller volumetric footprint when not being used, enabling easy storage. The magnets allow for quick mating and separation, while giving the user a satisfying audible feedback when mated. In some examples, other means for mating support stands 12 and 14 may be used (e.g, hook-and-loop fasteners, insertion of legs into receiving cavities). In some examples, an additional latching mechanism may be used in additional to the magnets, allowing for additional security for bumpy rides, etc. In some cases, battery power may be included to strengthen the magnetic connection when the support stands are mated, while disconnecting the battery may allow for ease of separation for deployment.

Figure 12:
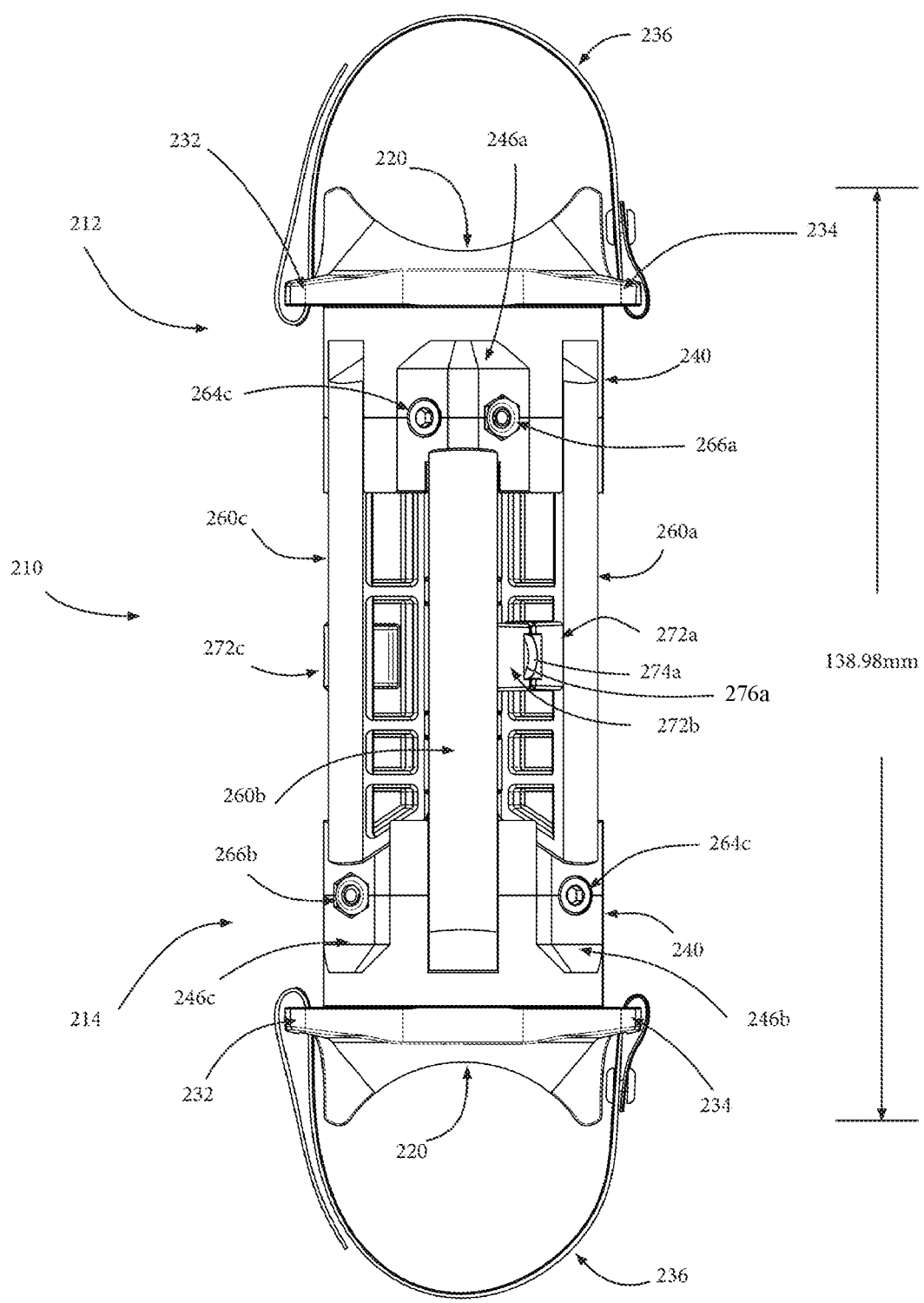
FIGS. 12-14 shows a perspective view of a mated dual support stand assembly of a second embodiment.
Figure 13:
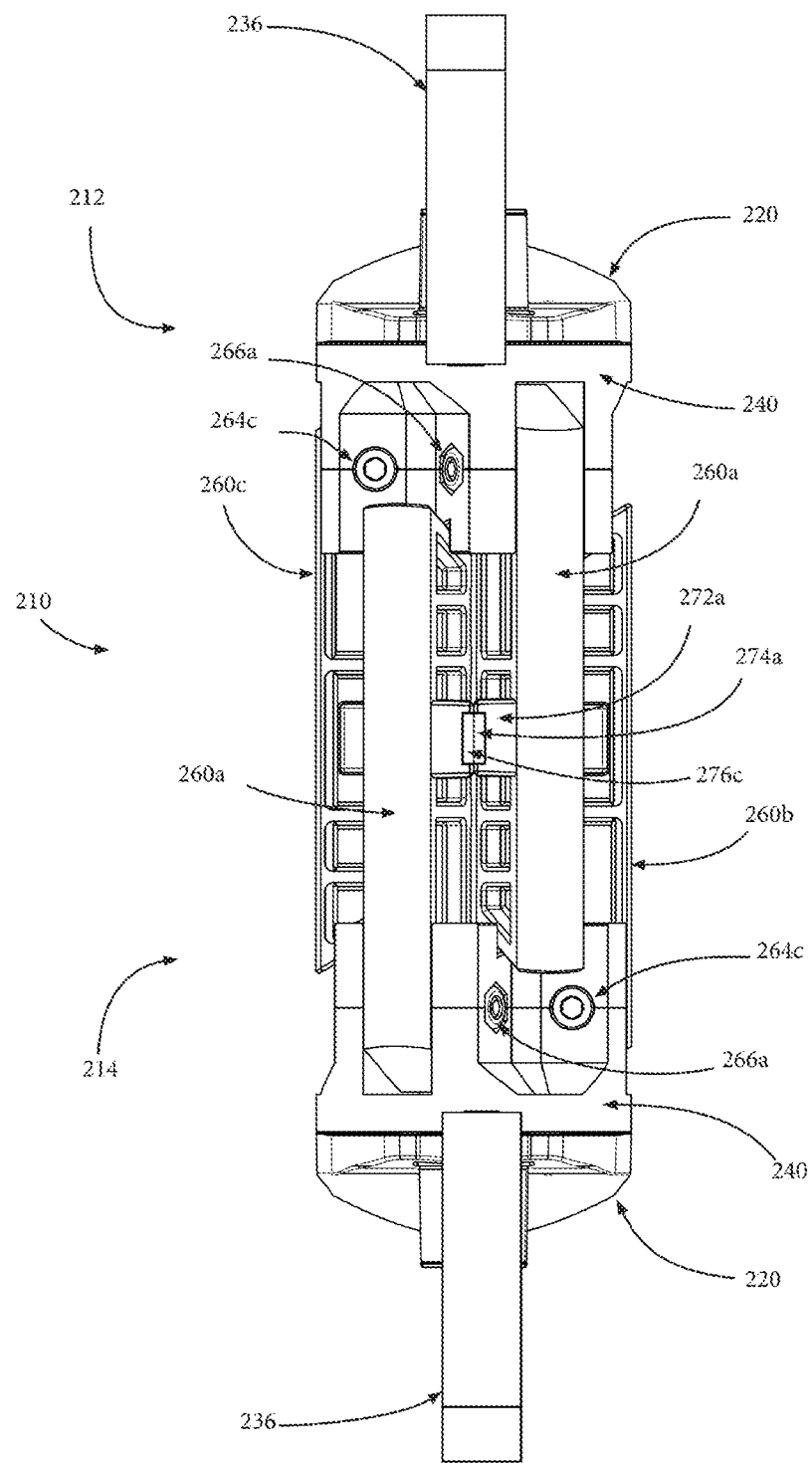
Figure 14:
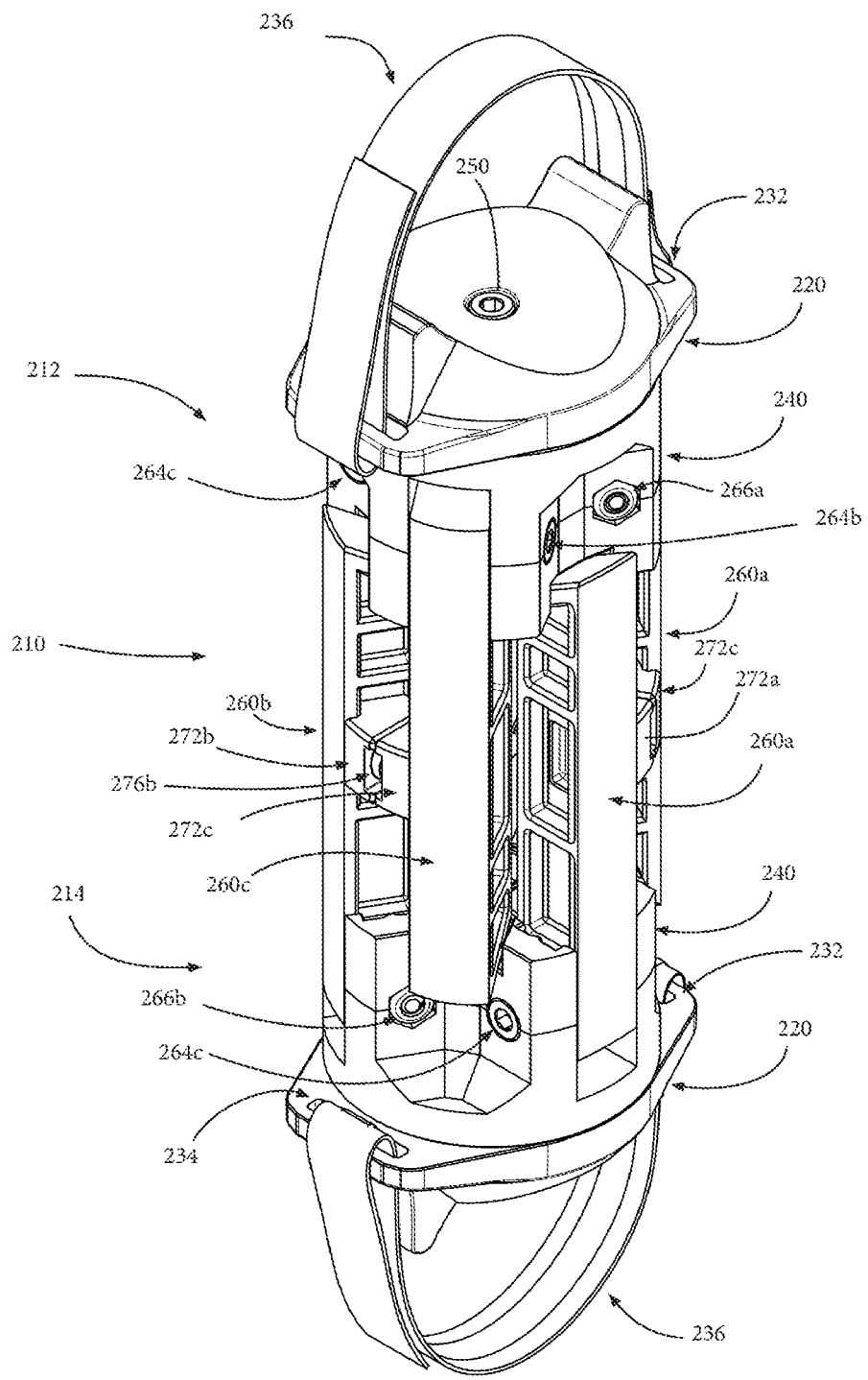

A second example embodiment is depicted in FIGS. 12-20. FIGS. 12-14 show an example mated dual support stand assembly 210, comprising a first support stand 212 and a second support stand 214. Support stands 212 and 214 may be examples of support stands 102 and 104. Each of first support stand 212 and second support stand 214 are configured to be adjustable between a closed conformation (shown in FIGS. 17 and 20) and an open conformation (shown in FIGS. 18 and 19). In the closed conformation, first support stand 212 and second support stand 214 are configured to reversibly mate to form mated dual support stand assembly 210.

As described herein, first support stand 212 and second support stand 214 are identical, excepting that first support stand 212 includes a set of magnets with a first polarity, and second support stand 214 includes a set of magnets with a second polarity, opposite the first polarity. With regard to FIGS. 15-20, wherein only a single support stand is shown, the stand and its components will be described with reference to first support stand 212. Excepting for the magnets and where otherwise noted, it should be assumed that the same components and configurations are also present on second support stand 214. Except where noted, components of first support stand 212 and second support stand 214 may be assumed to have similar properties to corresponding components in first support stand 12 and second support stand 14.

Figure 15:
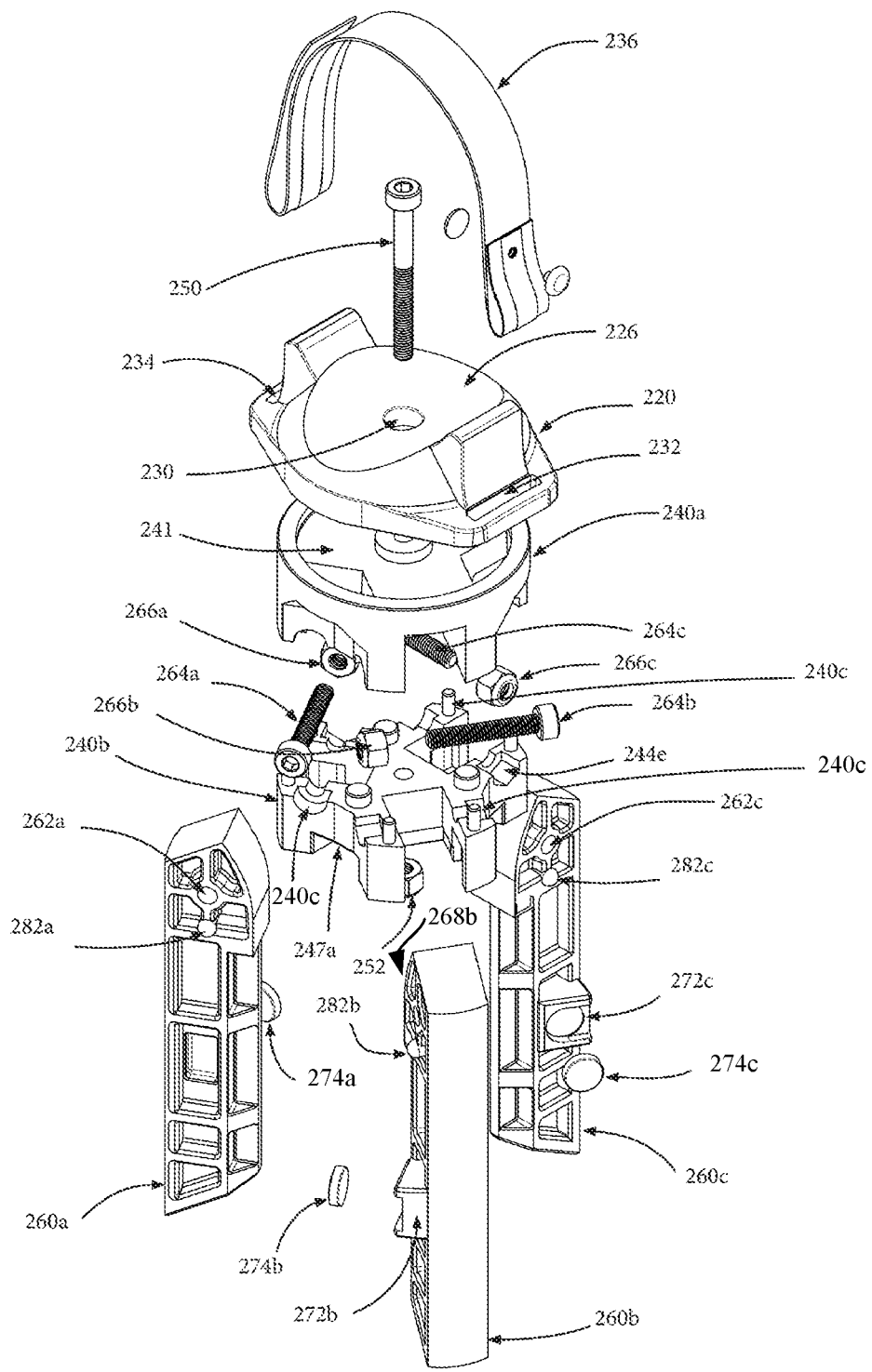
FIGS. 15-16 show exploded views of a single support stand of the second embodiment.
Figure 16:
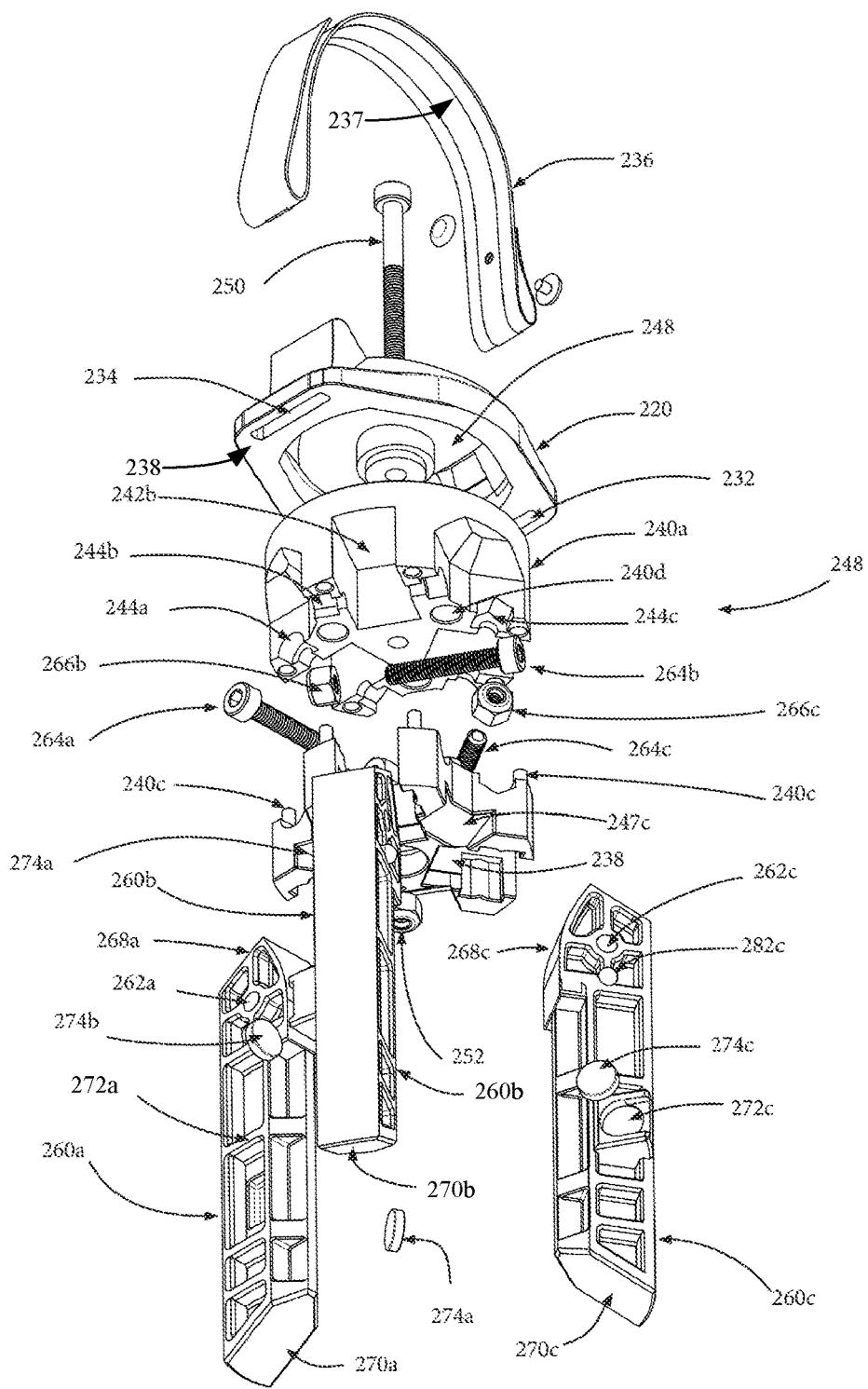

Parts of each support stand will be described with reference to the exploded views of first support stand 212 shown in FIGS. 15 and 16 as well as FIGS. 12-14 and 17-20 where appropriate. First support stand 212 includes a support interface 220, which may directly interface with an elongated tube, such as a handlebar and/or handlebar grip to provide support for an inverted bicycle. In this example, support interface 20 comprises a single piece that includes a support channel 226 having a U-shaped inner portion which may serve to mate with and provide a cradle for a cylindrical shaped elongated tube, such as a handlebar.

A support adapter mounting hole 230 is located in the center of support interface 220. As described further herein, mounting hole 230 may be used to align support interface 220 and to attach support interface 220 to the rest of first support stand 212. Support interface 220 may also include components for securely attaching first support stand 212 to an elongated tube. In this example, support interface 220 includes a first attachment point 232 and a second attachment point 234. First attachment point 232 and second attachment point 234 are shown as being identical rectangular holes on opposite sides of support interface 220 but other configurations are possible.

Opposite ends of a securing strap 236 may be inserted into first attachment point 232 and second attachment point 234. In this example, securing strap 236 is configured as a hook-and-loop strap, stably fixed to itself (e.g., via a rivet) at first attachment point 232, and configured to loop over an elongated tube, pass through second attachment point 234, and then reversibly attach to itself to generate a secure loop. First support stand 12 may then be removed from the elongated tube by simply detaching securing strap 36 from second attachment point 34. Securing strap 236 includes a friction band 237 on an inner surface where securing strap 236 is configured to interface with an elongated tube. For example, friction band 237 may be a silicone bead, a molded rubber strip, or other material configured to increase friction between securing strap 237 and an elongated tube.

Support interface 220 further features support adapter base 238, positioned opposite support channel 226. Support adapter base 38 is configured to interface with center adaptor 240 at center adaptor top 241. Center adaptor 240 functions to couple support interface 220 to the legs of first support stand 212. In this example, center adaptor 240 is configured with an upper subunit 240a and a lower subunit 240b, so as to enable efficient manufacturing through injection molding or other similar processes. In this example, lower subunit 240b includes a plurality of insertion tabs 240c, configured to be complimentary to a plurality of receiving slots 240 within upper subunit 240d.

Center adaptor 240 includes three leg mounts (242a, 242b, and 422c). Each leg mount includes a pair of mounting holes (244a, 244b, 244c, 244d, 244e, 244f), generated at the intersection of upper subunit 240a and lower subunit 240b. Each mounting hole is situated on a separate partition, such that two partitions form a leg mount, and such that each pair of adjacent leg mounts is separated by an indentation (46a, 46b, and 46c). Each indentations includes a receiving notch (247a, 247b, and 247c) shaped to receive a base of a leg from a mated support stand.

A central cavity 248 aligns with support interface mounting hole 230. A center bolt 250 may be inserted through support interface mounting hole 230 and central cavity 248, and secured with center nut 252 (see FIGS. 15-16). When assembled in this way, support interface 220 and center adaptor 240 may be rotatably coupled.

Figure 17:
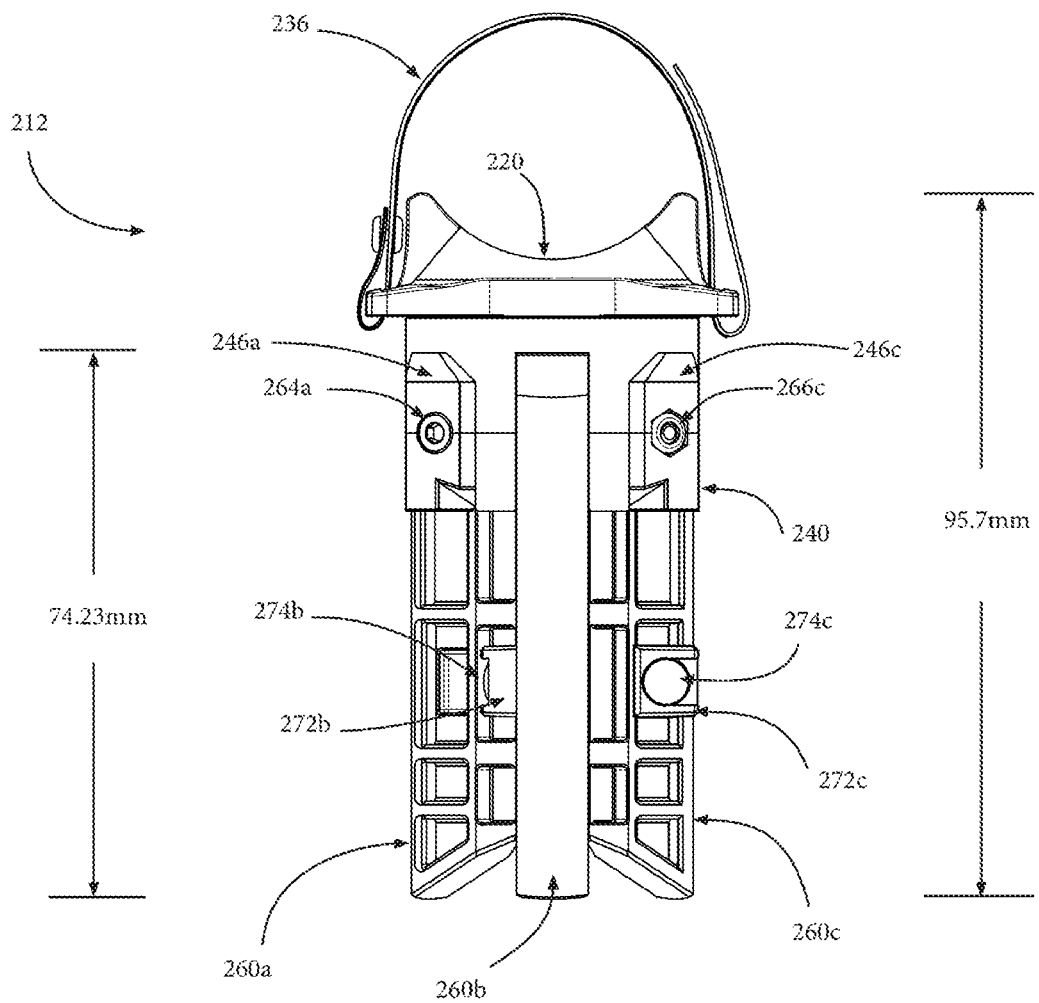
FIG. 17 shows a perspective view of a single support stand of the second embodiment in a closed conformation.
Figure 18:
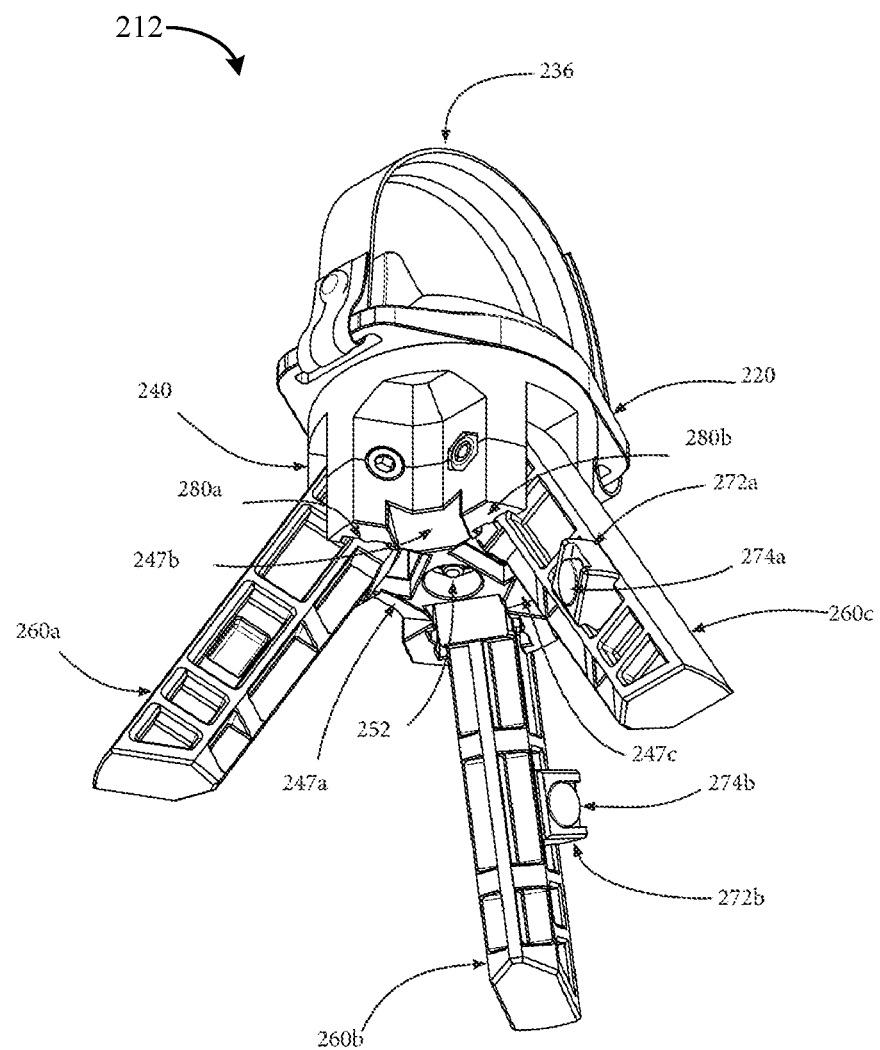
FIGS. 18-19 show perspective views of a single support stand of the second embodiment in an open conformation.
Figure 19:
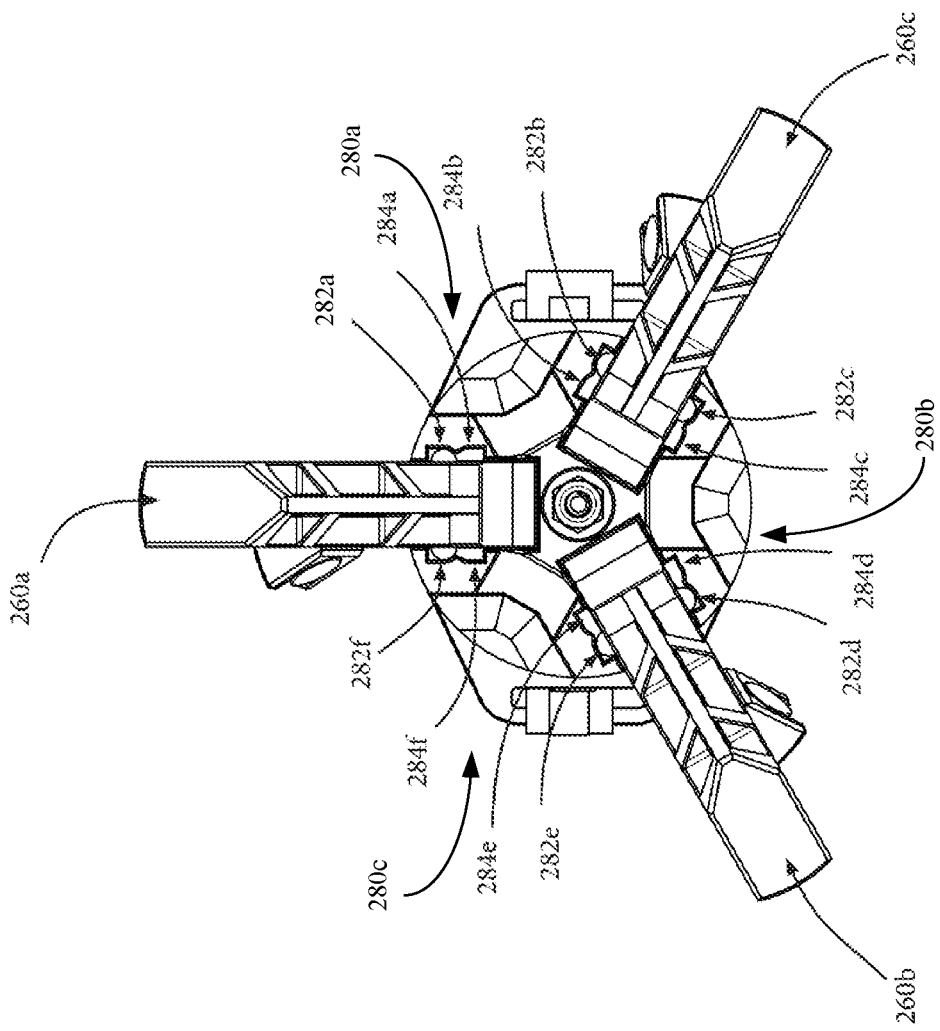

As described, first support stand 212 is a tripod including three legs (260a, 260b, and 260c), each leg operable between at least a closed conformation (see FIGS. 17, and 20) and an open conformation (see FIGS. 18-19). Each leg includes an adaptor mounting hole (e.g., 262a, 262b, and 262c) extending through a top portion of the leg. Leg mounting bolts (264a, 264b, and 264c) and leg mounting nuts (266a, 266b, and 266c) may be used to attach each leg to its corresponding leg mount.

Each leg may further include a motion restrictor (e.g., 268a, 268b, and 268c) that interfaces with the respective leg mount. For example, as leg 260a pivots around mounting bolt 264a, motion restrictor 268a may be sized and shaped to restrict movement of leg 260a into a closed conformation and an open conformation by abutting the leg mount in those positions. Each leg further has a leg base (e.g., 270a, 270b, and 270c) configured to interface with the ground when first support stand 12 is in the open conformation.

Each leg further includes a mating coupler (e.g., 272a, 272b, 272c) that houses a small magnet. Mating couplers 272a-272c extend laterally from their respective leg. As shown in FIGS. 12-14, this extension allows the magnets from first support stand 212 to mate with their counterparts from second support stand 214. In this example, support stand 212 includes three first polarity magnets (e.g., 274a, 274b, and 274c), while support stand 214 includes three second polarity magnets (e.g., 276a, 276b, 276c).

Figure 20:
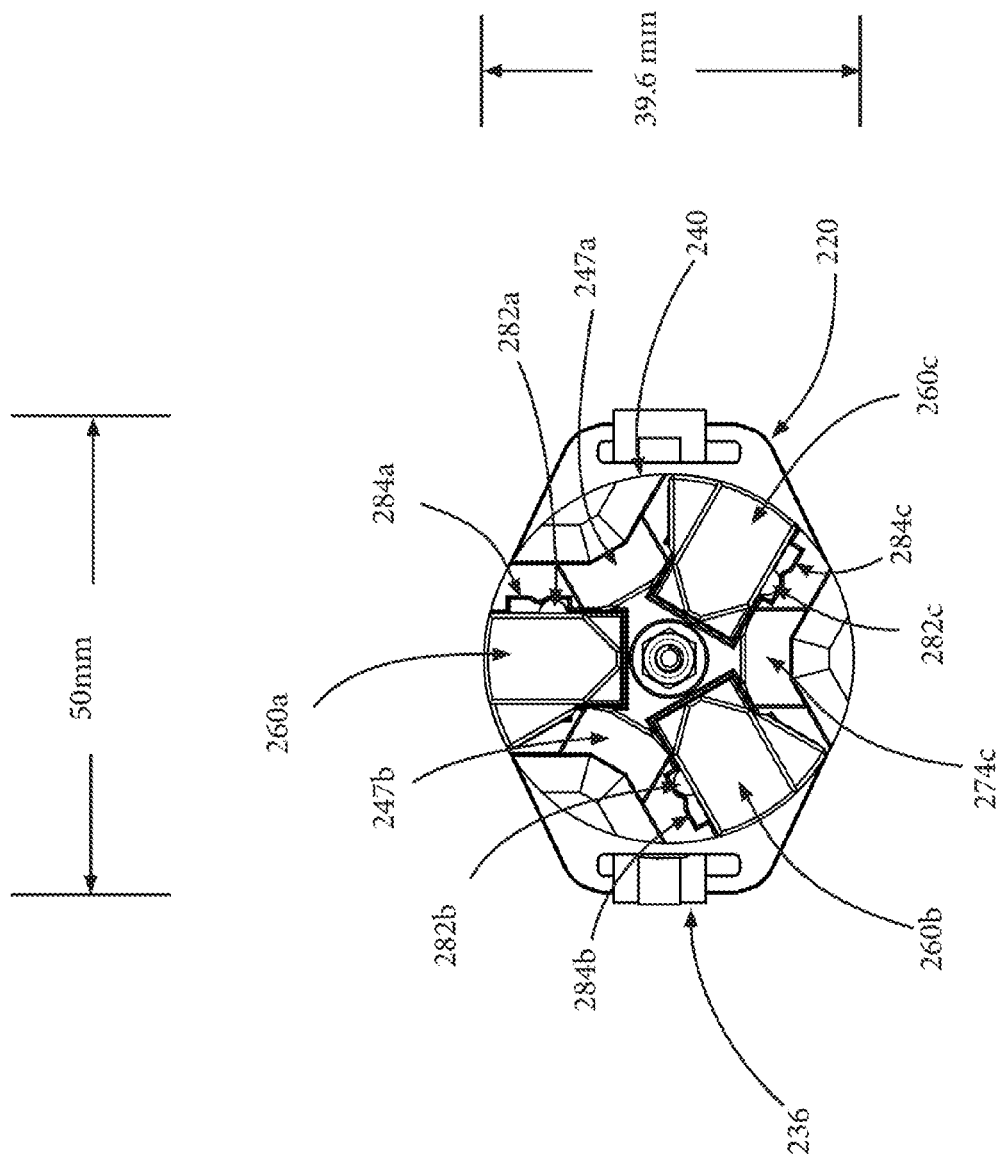
FIG. 20 shows a transparent, top down view of a single support stand in a closed conformation.

In addition to motion restrictors 268a-c, support stand 212 may include one or more leg detents (280a, 280b, 280c) for each leg 260a, 260b, and 260c (see FIGS. 19 and 20). Leg detents 280a-280c may be comprised of one or more leg detent knobs (282a, 282b, 282c, 282d, 282e, and 282f) extruding from the sides of each leg at the end proximal to each adaptor mounting hole (262a-262c). Each leg mount (242a-242c) of the center adaptor includes one or more center adaptor restrictors (284a, 284b, 284c, 284d, 284e, and 284f) configured to restrict movement of the corresponding leg when the leg is in either the open conformation or the closed conformation by abutting the corresponding leg detent knob(s). In this way, the conformation of the legs may be reinforced, reducing the likelihood of unwanted opening or closing of the legs, without requiring a user to spend time and effort locking the legs into position.

FIGS. 21-25 depict support stands 12 and 14 in a variety of perspectives featuring example dimensions, angles, arc paths, etc. Such dimensions are merely provided as examples, and should not be considered limiting in any sense.

Figure 21:
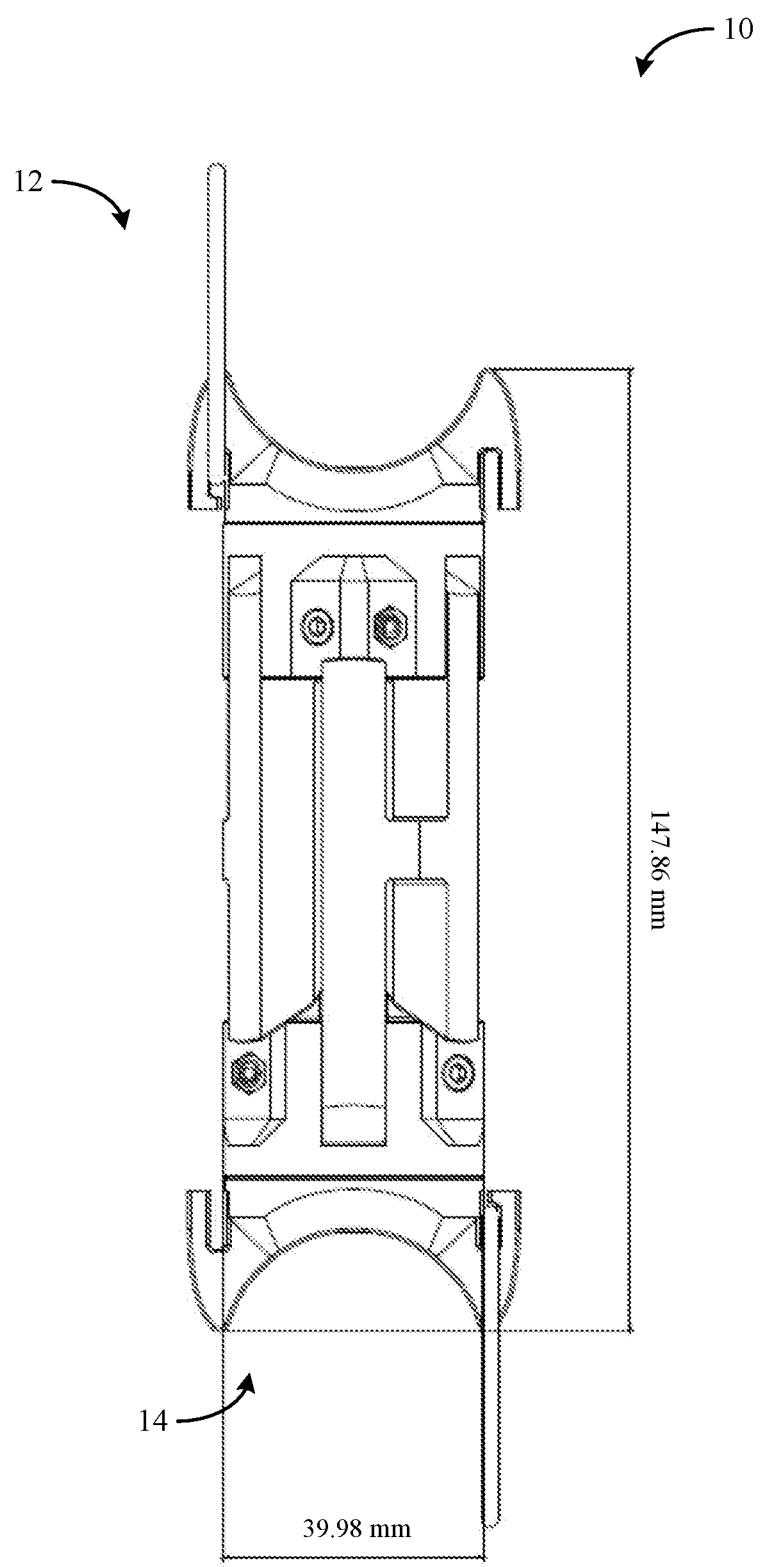
FIG. 21 shows a perspective view of a mated dual support stand assembly of the first embodiment with example dimensions.

FIG. 21 depicts a mated dual support stand assembly 10 including first support stand 12 and second support stand 14. In this example, the assembly measures 147.86 mm between the apexes of support channels 26. In this way, the rigid body of the assembly is modest, allowing for ease of storage and transportation. The peak-to-peak measurement of support channel 26 is shown as being 39.98 mm. In this way, support stands 12 and 14 may accommodate a variety of elongated tube diameters, including most popular handlebar widths. Similarly, mated dual support stand assembly 210 measures 138.98 mm between the apexes of support channel 226, as shown in FIG. 12, while peak-to-peak measurement of support channel 226 is shown as being 39.6 mm in FIG. 20.

Figure 22:
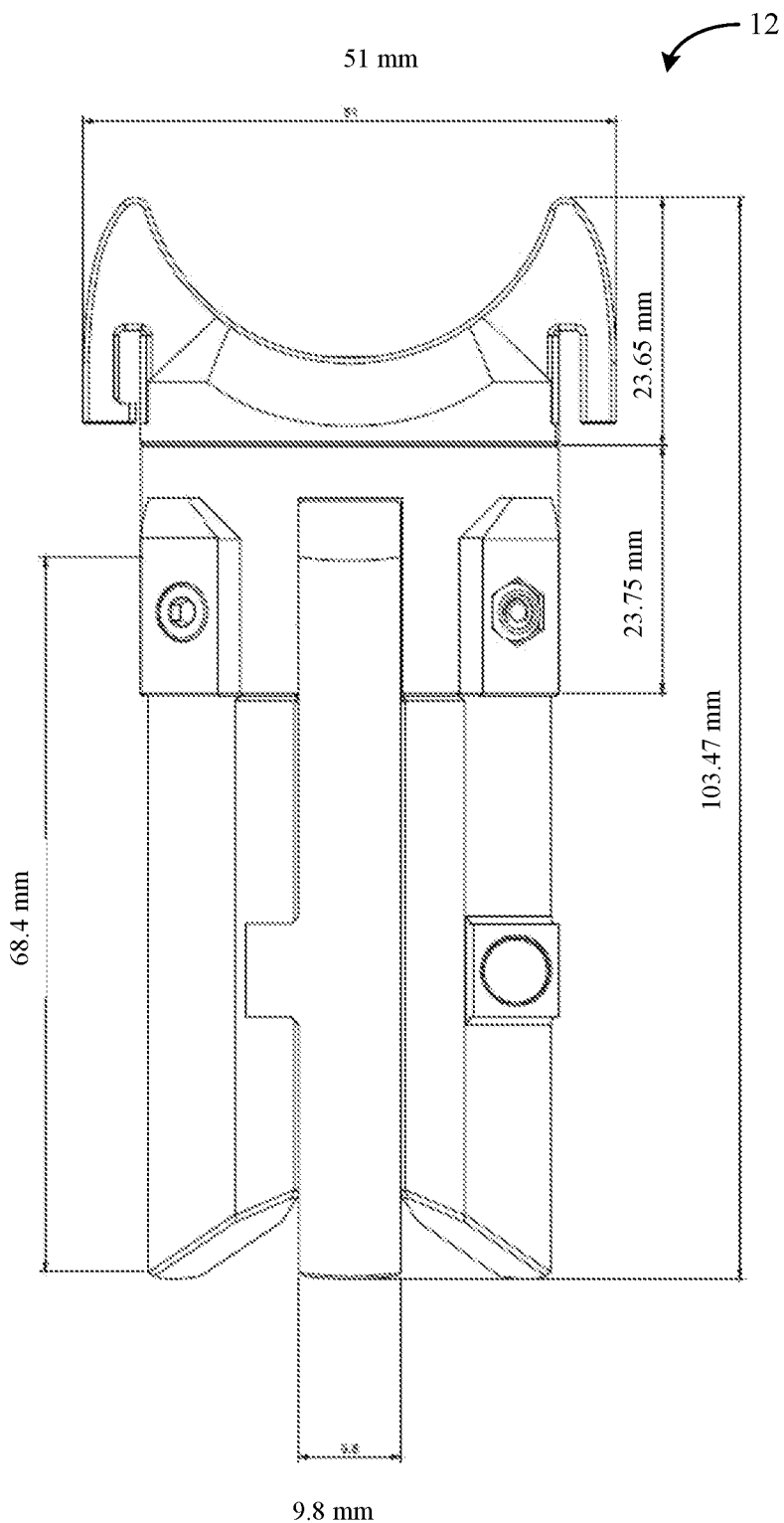
FIGS. 22-23 show perspective views of a single support stand of the first embodiment in a closed conformation with example dimensions.

FIG. 22 shows example dimensions of a first support stand 12 in a closed conformation. The width of center insert 22, including first and second attachment points 32 and 34 is 51 mm. The heights of support interface 20 and center adaptor 40 are 23.65 mm and 23.75 mm, respectively. The legs (60*a*, 60*b*, and 60*c*) measure 9.8 mm in width, and 68.4 mm in length, such that the rigid body of first support stand 12 measures 103.47 mm. Similarly, FIG. 17 shows legs 260*a*-260*c* measuring 74.13 mm, and a rigid body height of support stand 212 measuring 95.7 mm.

Figure 23:
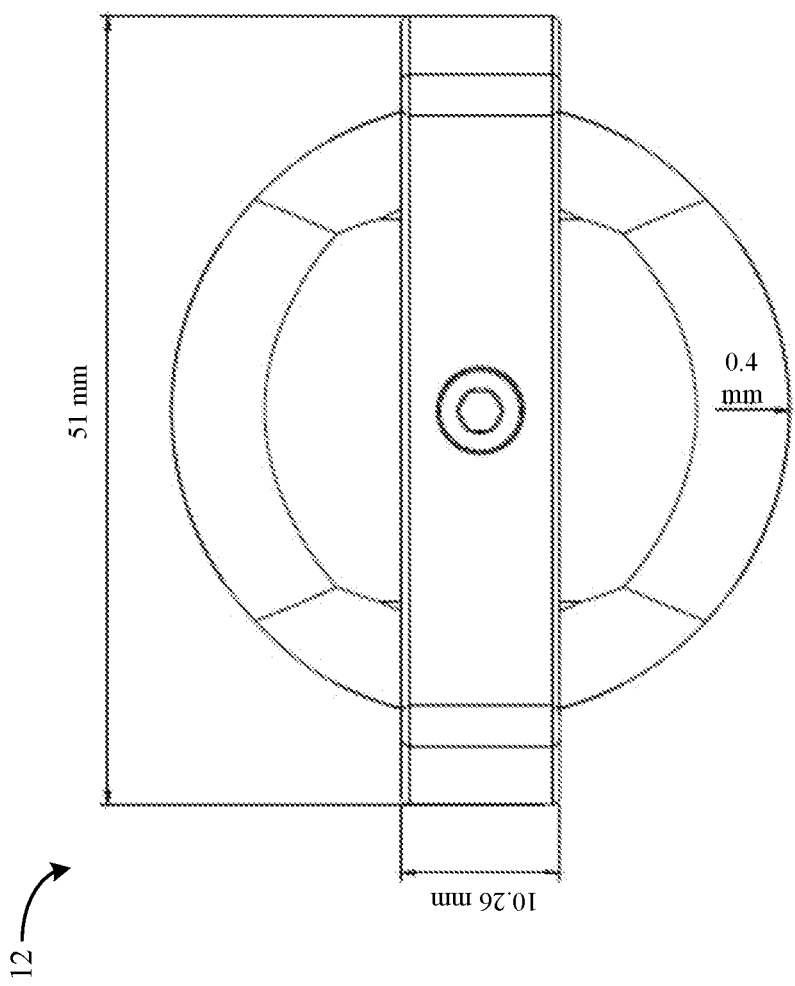

FIG. 23 shows example dimensions of support interface 20. In this example, the width of center insert 22 is 10.26 mm and there is a 4 mm lip at the edge of support adapter 24 that extends circumferentially. FIG. 20 shows example dimensions of support interface 220, including a 50 mm width between attachment points 232 and 234.

Figure 24:
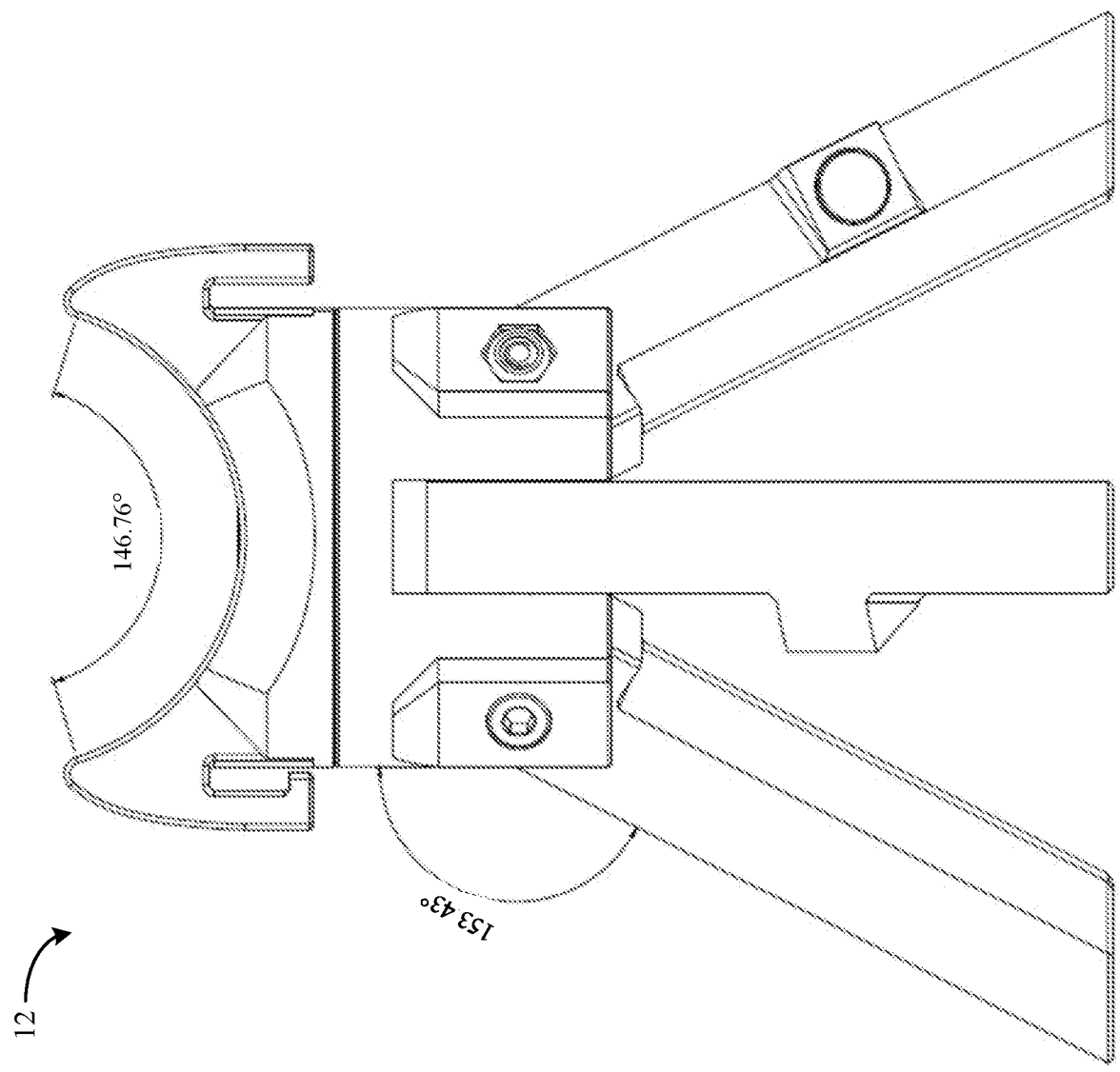
FIGS. 24-25 show perspective views of a single support stand of the first embodiment in an open conformation with example dimensions.
Figure 25:
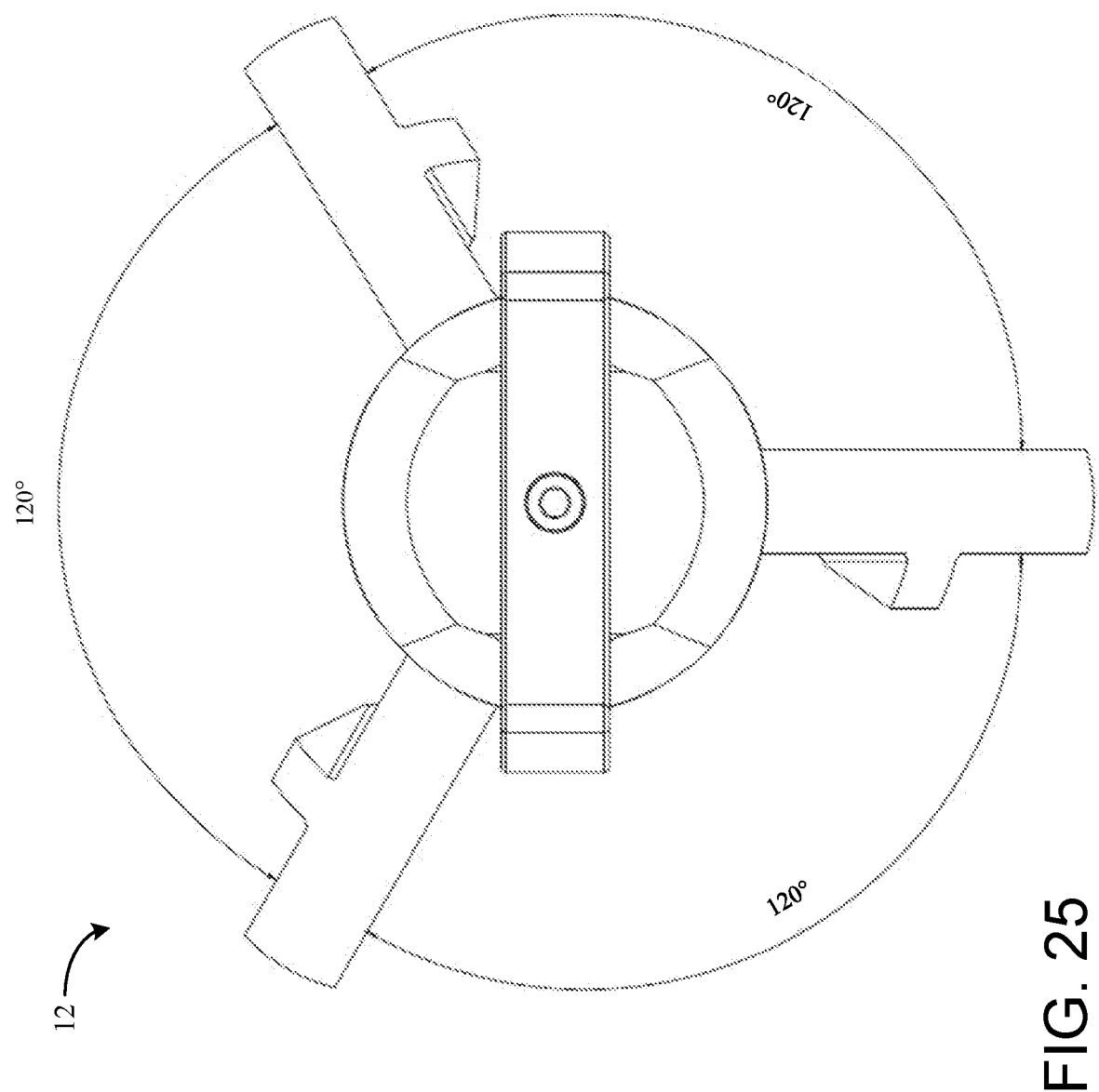

FIG. 24 shows first support stand 12 in an open conformation. In this example, the angle between each leg (60*a*, 60*b* 60*c*) and center adaptor 40 is 153.43°. However, if the legs are longer than shown in FIG. 22, the open angle may be increased accordingly to improve stability. The arc path of support channel 26 is shown as 146.76°. In this way, the support stand may receive a variety of widths of elongated tubes while providing support on both sides. FIG. 25 shows that the three legs (60*a*, 60*b*, 60*c*) are spaced evenly at 120° when support stand 12 is in the open conformation.

In some examples, the center adaptor (e.g., center adaptors 40, 240) may be coupled to the support interface (e.g., support interface 20, 220) such that the legs may rotate relative to the support interface based on gravity when the support interface is coupled to an elongate tube. This configuration may allow the user to place the support stands onto a set of handlebars at any angle, then letting the legs of the support stands rotate towards the ground as the bicycle is inverted. For example, the support interface may be a two-piece interface that wraps completely around the handlebars in a circle. The legs and/or center adaptor may rotate around the circle (e.g., on a rigid track that is completed when the support interface is coupled to the handlebars), and thus the legs may always point toward the ground. In some examples, the support interface and center adaptor may form a ball-and-socket type interface, such that the support interface and center adaptor may swivel around each other based on gravity and/or other forces applied to these components.

In some examples, one or both support stands may be configured to produce and/or reflect light for improved use at night or during otherwise low-visibility conditions. For example, an LED light module may be included between a support interface (e.g., support interfaces 20, 220) and a center adaptor (e.g., center adaptors 40, 240) or elsewhere. The legs and/or other components may be constructed from glow in the dark plastics, or otherwise be fitted with reflective or glow in the dark tape.

Additionally or alternatively, the legs of each support stand may be designed to be hollow or otherwise include some storage space and/or points of attachment for repair tools and supplies, such as allen wrenches and/or other small spare parts, patch kit components, tire levers, etc. In some examples, an adaptor may be included to allow for attachment of the mated support stand assembly to the bicycle via a seat or seat cover, bottle holder, or handlebars.

Although primarily described in the context of E-bikes and traditional bicycles that feature a console mounted to the handlebars, it should be understood that the support stands described herein may be utilized for any number of purposes. For example, the support stands may be used to keep the handlebars of any type of bicycle, tricycle, motorcycle, e-scooter, etc. off the ground when the device is placed in an inverted position. Aside from protecting an electronic console, this may provide stability on uneven ground, and/or may protect the handlebars themselves from surfaces that are wet, muddy, hazardous, or otherwise unsuitable for resting handlebars on. Still further, the support stands may be applied to any number of applications wherein it is desired to elevate an elongated tube or multiple coupled elongated tubes off the ground or off another surface, such as scaffolding for surveying equipment. In some examples, the support stands could be utilized to raise an artificial tree trunk, curtain rod, yard tool, etc. off the surface of a tool bench for ease of access to all sides of the elongated tube. In this context, an elongated tube need not be cylindrical in shape, and need not be continuous in diameter, nor free from bends, twists, or turns between the two attachment points for the support stands.

It will be understood that the configurations and/or approaches described herein are exemplary in nature, and that these specific embodiments or examples are not to be considered in a limiting sense, because numerous variations are possible.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. An assembly for mated dual support stands, comprising:
   two support stands, each support stand including:
      three or more legs operable between a closed conformation and an open conformation, such that in the closed conformation, the two support stands reversibly mate with each other;
      a support interface, positioned opposite the legs, the support interface reversibly attachable to an elongated tube via attachment componentry; and
      a center adaptor positioned connected to the support interface on one end and the three or more legs on the opposite end, the center adaptor and support interface rotatably coupled.

2. The assembly of claim 1, wherein each support stand includes one or more magnets attached to each leg, such that in the closed conformation, the magnets from a first support stand adhere to the magnets of a second support stand.

3. The assembly of claim 2, wherein each leg includes a mating adaptor that extends laterally from the respective leg and houses one or more magnets.

4. The assembly of claim 3, wherein battery power is used to strengthen the magnetic connection between the magnets from the first support stand and the magnets of the second support stand when the first and second support stands are mated.

5. The assembly of claim 1, wherein each leg combines with its respective leg mount to form a detent that restricts movement of the leg from the closed conformation.

6. The assembly of claim 1, wherein the center adaptor of a first support stand includes a receiving notch for each leg of the second support stand when the first support stand is mated with the second support stand.

7. A support stand for an elongated tube, comprising:
- three or more legs operable between a closed conformation and an open conformation, wherein the support stand is configured, when in the closed conformation, to reversibly mate with a second support stand;
- a support interface, positioned opposite the legs, the support interface reversibly attachable to the elongated tube via attachment components; and
- a center adaptor positioned connected to the support interface on one end and the three or more legs on the opposite end, the center adaptor and support interface rotatably coupled around a central cavity, and wherein each leg includes a motion restrictor that abuts a leg mount of the center adaptor when the leg is in either of the closed conformation and the open conformation.

8. The support stand of claim 7, wherein the support interface includes a first attachment point and a second attachment point for reversibly attaching a securing strap to reversibly couple the support interface to the elongated tube.

9. The support stand of claim 8, wherein the securing strap is an elastomeric strap.

10. The support stand of claim 8, wherein the securing strap is a hook-and-loop strap.

11. The support stand of claim 8, wherein the first attachment point is configured to restrict removal of the securing strap and wherein the second attachment point is configured to be permissive to removal of the securing strap, relative to the first attachment point.

12. The support stand of claim 7, wherein the support interface includes at least two separable pieces including a center insert and a support adapter, the center insert configured to nestle within an insert receiving groove within the support adapter.

13. The support stand of claim 12, wherein a support channel is formed by portions of both the center insert and the support adapter.

14. The support stand of claim 7, wherein the center adaptor is coupled to the support interface such that the legs rotate relative to the support interface based on gravity when the support interface is coupled to the elongated tube.

15. The support stand of claim 7, wherein each leg includes a mating adaptor that extends laterally from the respective leg and houses one or more magnets.

16. An assembly for mated dual support stands, comprising:
- two support stands, each support stand including:
    - three or more legs operable between a closed conformation and an open conformation, wherein each support stand includes one or more magnets attached to each leg, such that in the closed conformation, such that in the closed conformation, the two support stands reversibly mate with each other via the magnets from a first support stand adhering to the magnets of a second support stand;
    - a support interface, positioned opposite the legs, the support interface reversibly attachable to a bicycle handlebar via a securing strap; and
    - a center adaptor positioned connected to the support interface on one end and the three or more legs on the opposite end, the center adaptor and support interface rotatably coupled.

17. The assembly of claim 16, wherein each leg includes a mating adaptor that extends laterally from the respective leg and houses one or more of the magnets.

18. The assembly of claim 16, wherein each leg combines with its respective leg mount to form a detent that restricts movement of the leg from the closed conformation.

19. The assembly of claim 16, wherein the center adaptor of a first support stand includes a receiving notch for each leg of the second support stand when the first support stand is mated with the second support stand.

* * * * *